(12) United States Patent
Hsueh et al.

(10) Patent No.: US 11,163,136 B2
(45) Date of Patent: Nov. 2, 2021

(54) OPTICAL LENS ASSEMBLY AND IMAGE CAPTURING DEVICE

(71) Applicant: LARGAN PRECISION CO., LTD., Taichung (TW)

(72) Inventors: Chun-Che Hsueh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 97 days.

(21) Appl. No.: 16/752,873

(22) Filed: Jan. 27, 2020

(65) Prior Publication Data

US 2020/0158992 A1    May 21, 2020

Related U.S. Application Data

(63) Continuation of application No. 16/456,638, filed on Jun. 28, 2019, now Pat. No. 10,585,262, which is a (Continued)

(30) Foreign Application Priority Data

Feb. 4, 2015  (TW) ................... 104103810

(51) Int. Cl.
*G02B 9/12*    (2006.01)
*G02B 13/00*   (2006.01)

(52) U.S. Cl.
CPC ................... *G02B 13/0035* (2013.01)

(58) Field of Classification Search
CPC ............ G02B 9/12–32; G02B 13/04; G02B 13/0035; G02B 13/18; G02B 3/04; G02B 3/02; G02B 9/14
See application file for complete search history.

(56) References Cited

U.S. PATENT DOCUMENTS 2,380,210 A   7/1945 Bennett
2,503,751 A   4/1950 Litten et al.
(Continued)

FOREIGN PATENT DOCUMENTS

JP   1977097750    8/1977
JP   S62173416 A   7/1987
(Continued)

*Primary Examiner* — Balram T Parbadia
(74) *Attorney, Agent, or Firm* — Locke Lord LLP; Tim Tingkang Xia, Esq.

(57) ABSTRACT

An optical lens assembly includes, in order from an object side to an image side, a first lens element, a second lens element and a third lens element. The first lens element with positive refractive power has an object-side surface being convex, and the object-side surface and an image-side surface thereof are aspheric. The second lens element with negative refractive power has an image-side surface being concave, and an object-side surface and the image-side surface thereof are aspheric. The third lens element with refractive power has an object-side surface being concave, and the object-side surface and an image-side surface thereof are aspheric. The optical lens assembly further includes a stop with no lens element having refractive power disposed between the stop and the first lens element. The optical lens assembly has a total of three lens elements with refractive power.

25 Claims, 13 Drawing Sheets

Related U.S. Application Data continuation of application No. 16/015,491, filed on Jun. 22, 2018, now Pat. No. 10,386,603, which is a continuation of application No. 14/680,983, filed on Apr. 7, 2015, now Pat. No. 10,031,317.

(56) References Cited

U.S. PATENT DOCUMENTS

| | | | |
|---|---|---|---|
| 2,582,085 | A | 1/1952 | Tolle |
| 2,962,930 | A | 12/1960 | Johnson |
| 3,438,696 | A | 4/1969 | Ruben |
| 3,449,041 | A | 6/1969 | De Jager |
| 3,773,404 | A | 11/1973 | Moore |
| 4,109,995 | A | 8/1978 | Betensky |
| 4,702,569 | A | 10/1987 | Mercado |
| 4,704,008 | A | 11/1987 | Mercado |
| 4,761,064 | A | 8/1988 | Mercado |
| 4,762,404 | A | 8/1988 | Mercado |
| 4,765,727 | A | 8/1988 | Mercado |
| 4,790,637 | A | 12/1988 | Mercado et al. |
| 4,871,238 | A | 10/1989 | Sato et al. |
| 5,020,889 | A | 6/1991 | Mercado et al. |
| 5,175,652 | A | 12/1992 | Shimizu |
| 5,204,780 | A | 4/1993 | Sakamoto |
| 5,204,782 | A | 4/1993 | Mercado et al. |
| 5,210,646 | A | 5/1993 | Mercado et al. |
| 5,327,291 | A | 7/1994 | Baker et al. |
| 5,946,141 | A | 8/1999 | Harrigan |
| 6,028,711 | A * | 2/2000 | Adachi ............... G02B 13/24 359/642 |
| 6,624,953 | B2 * | 9/2003 | Noda ............... G02B 13/18 359/716 |
| 2009/0168197 | A1 * | 7/2009 | Hung ............... G02B 15/143507 359/689 |
| 2013/0301144 | A1 * | 11/2013 | Tsai ............... G02B 13/0035 359/716 |
| 2013/0301145 | A1 * | 11/2013 | Tsai ............... G02B 13/06 359/716 |
| 2014/0184877 | A1 * | 7/2014 | Ahn ............... G02B 9/02 348/340 |

FOREIGN PATENT DOCUMENTS

| | | |
|---|---|---|
| JP | 1989134412 A | 5/1989 |
| JP | H01237617 A | 9/1989 |
| JP | H04270309 A | 9/1992 |
| JP | H11006955 A | 1/1999 |
| JP | 2000162503 A | 6/2000 |
| JP | 2001075006 A | 3/2001 |
| JP | 2004118077 A | 4/2004 |
| JP | 2004251958 A | 9/2004 |
| JP | 2004251959 A | 9/2004 |
| JP | 2005258181 A | 9/2005 |
| JP | 2007010700 A | 1/2007 |
| JP | 2009086566 A | 4/2009 |
| JP | 2009156950 A | 7/2009 |
| JP | 2012141465 A | 7/2012 |

* cited by examiner

OPTICAL LENS ASSEMBLY AND IMAGE CAPTURING DEVICE

RELATED APPLICATIONS

This application is a continuation application of U.S. application Ser. No. 16/456,638 filed on Jun. 28, 2019, which is a continuation application of U.S. application Ser. No. 16/015,491 filed on Jun. 22, 2018, which is a continuation application of U.S. application Ser. No. 14/680,983 filed on Apr. 7, 2015, which claims priority to Taiwan Application No. 104103810 filed Feb. 4, 2015. The entire disclosure of which is incorporated by reference herein.

BACKGROUND

Technical Field

The present disclosure relates to an optical lens assembly and an image capturing device. More particularly, the present disclosure relates to a compact optical lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have reduced the pixel size of image sensors and compact optical systems have gradually evolved toward the field of higher megapixels, there is an increasing demand for compact optical systems featuring better image quality.

Conventional optical system for telephoto adapts multi-piece lens structure and the lens elements thereof are made of glass material and surfaces of each lens element are spherical. However, the optical system is expansive, bulk, difficult to carry, and cannot satisfy the requirements of convenient and multi-function specifications.

SUMMARY

According to one aspect of the present disclosure, an optical lens assembly includes, in order from an object side to an image side, a first lens element, a second lens element, and a third lens element. The first lens element with positive refractive power has an object-side surface being convex, wherein the object-side surface and an image-side surface of the first lens element are aspheric. The second lens element with negative refractive power has an image-side surface being concave, wherein an object-side surface and the image-side surface of the second lens element are aspheric. The third lens element with refractive power has an object-side surface being concave, wherein the object-side surface and an image-side surface of the third lens element are aspheric. The optical lens assembly further includes a stop, wherein no lens element with refractive power is disposed between the stop and the first lens element. The optical lens assembly has a total of three lens elements with refractive power.

When a focal length of the optical lens assembly is f, a curvature radius of the image-side surface of the second lens element is R4, a curvature radius of the object-side surface of the third lens element is R5, an axial distance between the stop and the image-side surface of the third lens element is SD, and an axial distance between the object-side surface of the first lens element and the image-side surface of the third lens element is TD, the following conditions are satisfied:

$1.25 < f/R4;$ $-1.0 < R5/f < 0;$ and $0.6 < SD/TD < 1.0.$

According to another aspect of the present disclosure, an imaging capturing device including the optical lens assembly according to the aforementioned aspect and an image sensor, wherein the image sensor is located at the image side of the optical lens assembly.

According to further another aspect of the present disclosure, an image capturing device including the optical lens assembly according to the aforementioned aspect, a prism, and an image sensor, the optical lens assembly is located between the prism and the image sensor.

According to yet another aspect of the present disclosure, an optical lens assembly includes, in order from an object side to an image side, a first lens element, a second lens element, and a third lens element. The first lens element with positive refractive power has an object-side surface being convex, wherein the object-side surface and an image-side surface of the first lens element are aspheric. The second lens element with negative refractive power has an image-side surface being concave, wherein an object-side surface and the image-side surface of the second lens element are aspheric. The third lens element with negative refractive power has an object-side surface being concave, wherein the object-side surface and an image-side surface of the third lens element are aspheric. The optical lens assembly has a total of three lens elements with refractive power, and the first through third lens elements are three independent and non-cemented lens elements. When a focal length of the optical lens assembly is f, a curvature radius of the image-side surface of the second lens element is R4, and a curvature radius of the object-side surface of the third lens element is R5, the following conditions are satisfied:

$1.25 < f/R4;$ and $-2.6 < R5/f < 0.$

According to still another aspect of the present disclosure, and optical lens assembly includes, in order from an object side to an image side, a first lens element, a second lens element, and a third lens element. The first lens element with positive refractive power has an object-side surface being convex, and the object-side surface and an image-side surface of the first lens element are aspheric. The second lens element with negative refractive power has an image-side surface being concave, and an object-side surface and the image-side surface of the second lens element are aspheric. The third lens element with refractive power has an object-side surface being concave, and the object-side surface and an image-side surface of the third lens element are aspheric. The optical lens assembly has a total of three lens elements with refractive power. When a focal length of the optical lens assembly is f, a curvature radius of the image-side surface of the second lens element is R4, a curvature radius of the object-side surface of the third lens element is R5, an Abbe number of the first lens element is V1, an Abbe number of the second lens element is V2, and an Abbe number of the third lens element is V3, the following conditions are satisfied:

$0.50 < f/R4;$ $-2.6 < R5/f < 0;$ and $(V2+V3)/V1 < 1.0.$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
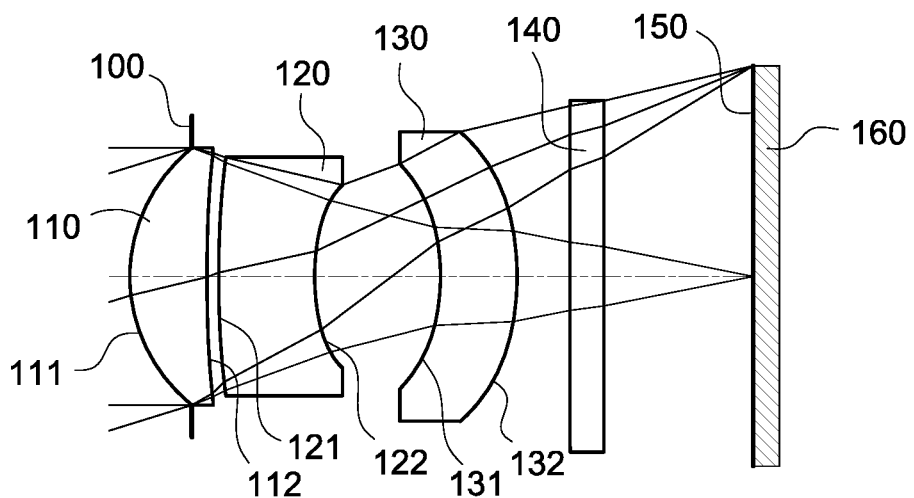
FIG. 1 is a schematic view of an image capturing device according to the 1st embodiment of the present disclosure.

An optical lens assembly includes, in order from an object side to an image side, a first lens element, a second lens element, and a third lens element. The optical lens assembly has a total of three lens elements with refractive power.

The first lens element with positive refractive power has an object-side surface being convex, and the object-side surface and an image-side surface are aspheric. The object-side surface of the first lens element can have the largest curvature of all surfaces of lens elements in the optical lens assembly, so that the refractive power centers on the object side of the optical lens assembly. The first lens element with designable positive refractive power makes the optical lens assembly more compact and portable.

The second lens element with negative refractive power has an image-side surface being concave, and an object-side surface and the image-side surface are aspheric. The image-side surface of the first lens element and the object-side surface of the second lens element can have the smallest curvature of all surfaces of lens elements in the optical lens assembly. Therefore, the aberration generated by the first lens element can be corrected and the designable convergence across different wavelength range is provided. Moreover, a curvature of the image-side surface of the second lens element can be increasingly concave from a paraxial region to an off-axis region thereof. Therefore, the light-receiving magnitude is improved and image is more clarity since the marginal ray is effective controlled.

The third lens element with refractive power has an object-side surface being concave, and the object-side surface and the image-side surface are aspheric. An image-side surface of the third lens element can be convex. Therefore, the aberration of the optical lens assembly can be corrected. Moreover, a curvature of the object-side surface of the third lens element can be increasingly concave from a paraxial region to an off-axis region thereof. Therefore, light-receiving efficient from the off-axis field can be enhanced to increase relative illumination of peripheral image.

The object-side surfaces and the image-side surfaces of the first lens element, the second lens element, and the third lens element are arranged to be aspheric, since the aspheric surface of the lens element is easy to form a shape other than spherical surface of the lens element so as to have more controllable variable for eliminating the aberration thereof, and to further decrease the required number of the lens elements. Therefore, the total track length of the optical lens assembly can also be reduced.

When a focal length of the optical lens assembly is f, and a curvature radius of the image-side surface of the second lens element is R4, the following condition is satisfied: $0.50 < f/R4$. Therefore, the spherical aberration and astigmatism generated by the first lens element with high refractive power can be balanced. Preferably, the following condition is satisfied: $1.25 < f/R4$. More preferably, the following condition is satisfied: $1.65 < f/R4 < 6.0$.

When the focal length of the optical lens assembly is f, and a curvature radius of the object-side surface of the third lens element is R5, the following condition is satisfied: $-2.6<R5/f<0$. Therefore, the stray light can be eliminated since the incident angle of light is alleviated, and refractive power of the third lens element can be controlled to make the optical lens assembly having an applicable back focal length. Preferably, the following condition is satisfied: $-1.0<R5/f<0$.

The optical lens assembly further includes an aperture stop with no lens element having refractive power disposed between the aperture stop and the first lens element. The aperture stop is for eliminating the stray light and thereby improving the image resolution. When an axial distance between the aperture stop and the image-side surface of the third lens element is SD, and an axial distance between the object-side surface of the first lens element and the image-side surface of the third lens element is TD, the following condition is satisfied: $0.6<SD/TD<1.0$. Therefore, the telecentric effect of the optical lens assembly can be effectively enhanced.

When an Abbe number of the first lens element is V1, an Abbe number of the second lens element is V2, and an Abbe number of the third lens element is V3, the following condition is satisfied: $(V2+V3)/V1<1.0$. Therefore, the chromatic aberration of the optical lens assembly can be corrected.

According to the optical lens assembly of the present disclosure, the first to third lens elements are three independent and non-cemented lens elements. In other words, there is an air gap between any two of the first lens element, the second lens element, and the third lens element that are adjacent to each other. The manufacturing process of the cemented lens element is more complex than that of the non-cemented lens elements. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical lens assembly. Therefore, according to the optical lens assembly of the present disclosure, the first lens element, the second lens element, and the third lens element are independent and non-cemented lens elements for improving the problem generated by the cemented lens elements.

When a curvature radius of the object-side surface of the first lens element is R1, and the focal length of the optical lens assembly is f, the following condition is satisfied: $0<R1/f<0.40$. Therefore, focal range is converged since light beam passing through the optical lens assembly is controlled and the telephoto ability is then improved.

When an axial distance between the first lens element and the second lens element is T12, and an axial distance between the second lens element and the third lens element is T23, the following condition is satisfied: $0<T12/T23<1.0$. Therefore, the space allocation of the lens elements can be balanced, and optical trace of light after sharply refracted can be alleviated since sufficient space between the second lens element and the third lens element, and then the aberration can be corrected. Preferably, the following condition is satisfied: $0<T12/T23<0.50$.

When the focal length of the optical lens element is f, and a maximum image height of the optical lens assembly is ImgH, the following condition is satisfied: $2.3<f/ImgH<4.5$. Therefore, image range of the optical lens assembly can be effectively suppressed for obtaining a higher resolving power of local image.

When the focal length of the optical lens assembly is f, a focal length of the first lens element is f1, and a focal length of the second lens element is f2, the following condition is satisfied: $3.0<|f/f1|+|f/f2|<6.0$. Therefore, the capability of controlling light beam is centered on the object side of the optical lens assembly, and the image quality for narrowing view angle can be enhanced. Preferably, the following condition is satisfied: $3.65<|f/f1|+|f/f2|<6.0$.

When the axial distance between the first lens element and the second lens element is T12, and a central thickness of the second lens element is CT2, the following condition is satisfied: $0<T12/CT2<0.80$. Therefore, the space utilization ratio of the lens elements with refractive power is increased and then space usage efficiency can be improved.

When a curvature radius of the image-side surface of the first lens element is R2, and a curvature radius of the object-side of the second lens element is R3, the following condition is satisfied: $0.5<|(R2+R3)/(R2-R3)|<20$. Therefore, the aberration of the optical lens assembly can be corrected.

When a half of a maximum field of view of the optical lens assembly is HFOV, the following condition in satisfied: $7.5 \text{ degrees}<HFOV<23.5 \text{ degrees}$. Therefore, a sufficient field of view can be obtained.

When a central thickness of the first lens element is CT1, and the central thickness of the second lens element is CT2, the following condition is satisfied: $0<CT1/CT2<1.65$. Therefore, the moldability of homogeneity of the lens elements can be enhanced. Preferably, the following condition is satisfied: $0<CT1/CT2<1.00$.

When the axial distance between the object-side surface of the first lens element and the image-side surface of the third lens element is TD, and the focal length of the optical lens assembly is f, the following condition is satisfied: $0.50<TD/f<0.90$. Therefore, it is favorable for making a balance between volume and ability of photo taking at distance range of the optical lens assembly.

When the central thickness of the first lens element is CT1, the central thickness of the second lens element is CT2, and a central thickness of the third lens element is CT3, the following condition is satisfied: $1.30<(CT2+CT3)/CT1$. Therefore, proper arrangement in thickness for the first lens element, the second lens element, and the third lens element are favorable for assembling and manufacturing the optical lens assembly.

According to the optical lens assembly of the present disclosure, the first lens element, the second lens element, and the third lens element can be made of plastic, so that the manufacturing cost can be effectively reduced.

When an axial distance between the image-side surface of the first lens element and an image surface is TL, and the maximum image height of the optical lens assembly is ImgH, the following condition is satisfied: $2.0<TL/ImgH<3.5$. Therefore, the compact size of the image capturing device is maintained and can be employed in compact electronic device.

When the curvature radius of the object-side surface of the second lens element is R3, and the curvature radius of the image-side surface of the second lens element is R4, the following condition is satisfied: $0.3<(R3+R4)/(R3-R4)<2.5$. Therefore, the aberration can be further corrected.

When an entrance pupil diameter of the optical lens assembly is EPD, and the maximum image height of the optical lens assembly is ImgH, the following condition is satisfied: 0.90<EPD/ImgH<1.7. Therefore, image quality of the optical lens assembly can be enhanced since the light-receiving magnitude in a unit area of image is improved.

According to the optical lens assembly of the present disclosure, the lens elements can be made of glass, and when the lens elements are made of glass material, the distribution of the refractive powers of the optical lens assembly may be more flexible to design.

According to the optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof, and when the lens element has a concave surface, it indicates that the surface is concave in the paraxial region thereof. According to the optical lens assembly of the present disclosure, the positive refractive power or the negative refractive power of a lens element or the focal length of the lens element, that is, refers to the refractive power or the focal length in a paraxial region of the lens element.

According to the optical lens assembly of the present disclosure, the image surface of the optical lens assembly, based on the corresponding image sensor, can be flat or curve. For instant, the image surface can be a curved surface being concave towards the object side.

According to the optical lens assembly of the present disclosure, the aperture stop can be configured as a front stop or middle stop. A front stop disposed between an image object and the first lens element can provided a longer distance between an exit pupil of the optical lens assembly and the image surface and thereby improve the image-sensing efficiency of the image sensor. A middle stop disposed between the first lens element and the image surface is favorable for enlarging the field of the optical lens assembly and thereby provides a wider field of view for the same.

According to the present disclosure, an image capturing device is provided. The image capturing device includes the aforementioned optical lens assembly and an image sensor. The image sensor is located at the image side of the optical lens assembly. In the present invention, convergence of the optical lens assembly centers on the object side of the optical lens assembly since the first lens element with designable positive refractive power, so that the optical lens is more compact and portable. The second lens element with designable negative refractive power can effectively correct aberration generated by the first lens element and can provide the designable convergence across different wavelength range. Preferably, the image capturing device can further include a barrel member, a holding member or a combination thereof.

According to the above description of the present invention, the following 1st-14th specific embodiments are provided for further explanation.

1st Embodiment

Figure 2:
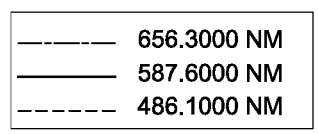
FIG. 2 shows spherical aberration curves, astigmatic field curves, and a distortion curve of the image capturing device according to the 1st embodiment.
Figure 2:
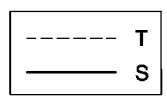
Figure 2:
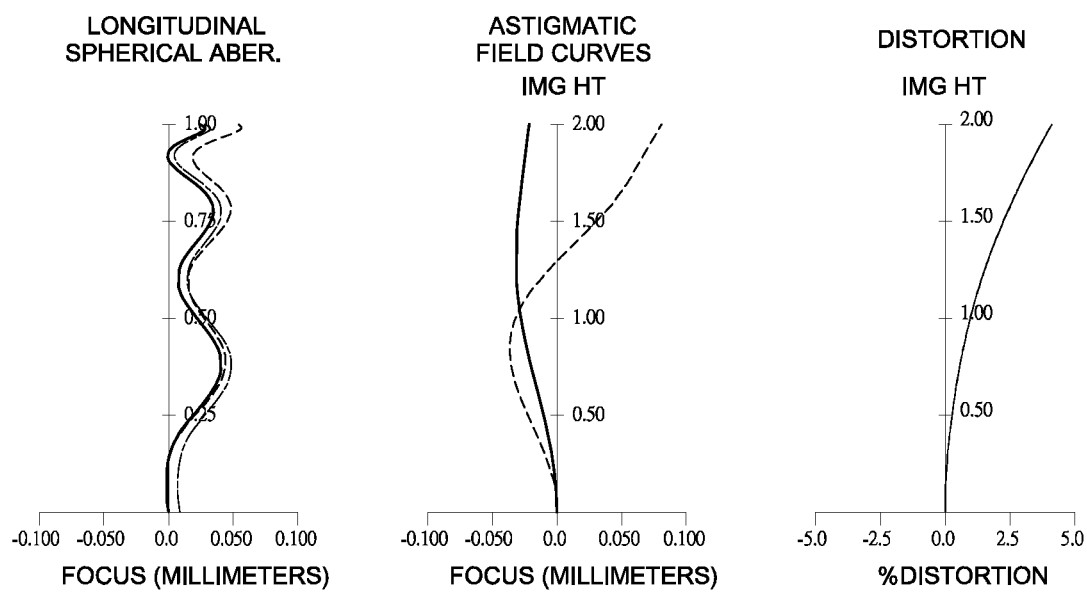

FIG. 1 is a schematic view of an image capturing device according to 1st embodiment of the present invention. FIG. 2 shows spherical aberration curves, astigmatic field curves, and a distortion curve of the image capturing device according to the 1st embodiment. In FIG. 1, the image capturing device includes an optical lens assembly (in reference numeral is omitted) and an image sensor 160. The optical lens assembly includes, in order from an object side to an image side, an aperture stop 100, a first lens element 110, a second lens element 120, a third lens element 130, an IR-filter 140, and an image surface 150, wherein the image sensor 160 is located at the image surface 150 of the optical lens assembly. The optical lens assembly has a total of three lens elements (110-130) with refractive power, and the first lens element 110, the second lens element 120, and the third lens element 130 are independent and non-cemented lens elements.

The first lens element 110 with positive refractive power has an object-side surface 111 being convex and an image-side surface 112 being concave. The first lens element 110 is made of plastic material and has the object-side surface 111 and the image-side surface 112 being both aspheric. The object-side surface 111 of the first lens element 110 has the largest curvature of all surfaces of lens elements in the optical lens assembly.

The second lens element 120 with negative refractive power has an object-side surface 121 being convex and an image-side surface 122 being concave. The second lens element 120 is made of plastic material and has the object-side surface 121 and the image-side surface 122 being both aspheric. A curvature of the second lens element 120 is increasingly concave from a paraxial region to an off-axis region thereof, and the image-side surface 112 of the first lens element 110 and the object-side surface 121 of the second lens element 120 have the smallest curvature of all surfaces of lens elements in the optical lens assembly.

The third lens element 130 with negative refractive power has an object-side surface 131 being concave and an image-side surface 132 being convex. The third lens element 130 is made of plastic material and has the object-side surface 131 and the image-side surface 132 being both aspheric. A curvature of the object-side surface 131 of the third lens element 130 is increasingly concave from a paraxial region to an off-axis region thereof.

The IR-filter 140 is made of glass material and located between the third lens element 130 and the imaging surface 150, and will not affect the focal length of the optical lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_{i}(Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens assembly according to 1st embodiment, when a focal length of the optical lens assembly is f, a f-number of the optical lens assembly is Fno, and a half of maximum field of view of the optical lens assembly is HFOV, these parameters have the following value: f=6.2 mm, Fno=2.55, HFOV=17.1 degrees.

In the optical lens assembly according to 1st the embodiment, when an Abbe number of the first lens element 110 is V1, an Abbe number of the second lens element 120 is V2, and an Abbe number of the third lens element 130 is V3, the following condition is satisfied: (V2+V3)/V1=0.77.

In the optical lens assembly according to the 1st embodiment, when a central thickness of the first lens element 110 is CT1, and a central thickness of the second lens element 120 is CT2, the following condition is satisfied: CT1/CT2=0.80.

In the optical lens assembly according to the 1st embodiment, when the central thickness of the first lens element 110 is CT1, the central thickness of the second lens element 120 is CT2, and a central thickness of the third lens element 130 is CT3, the following condition is satisfied: (CT2+CT3)/CT1=2.25.

In the optical lens assembly according to the 1st embodiment, when an axial distance between the first lens element 110 and the second lens element 120 is T12, and the central thickness of the second lens element is CT2, the following condition is satisfied: T12/CT2=0.12.

In the optical lens assembly according to the 1st embodiment, when the axial distance between the first lens element 110 and the second lens element 120 is T12, and an axial distance between the second lens element 120 and the third lens element 130 is T23, the following condition is satisfied: T12/T23=0.09.

In the optical lens assembly according to the 1st embodiment, when a curvature radius of the object-side surface 111 of the first lens element 110 is R1, and the focal length of the optical lens assembly is f, the following condition is satisfied: R1/f=0.25.

In the optical lens assembly according to the 1st embodiment, when the focal length of the optical lens assembly is f, and a curvature radius of the image-side surface 122 of the second lens element 120 is R4, the following condition is satisfied: f/R4=2.80.

In the optical lens assembly according to the 1st embodiment, when a curvature radius of the object-side surface 131 of the third lens element 130 is R5, and the focal length of the optical lens assembly is f, the following condition is satisfied: R5/f=−0.35.

In the optical lens assembly according to the 1st embodiment, when a curvature radius of the image-side surface 112 of the first lens element 110 is R2, and a curvature radius of the object-side surface 121 of the second lens element 120 is R3, the following condition is satisfied: |(R2+R3)/(R2−R3)|=9.32.

In the optical lens assembly according to the 1st embodiment, when the curvature radius of the object-side surface 121 of the second lens element 120 is R3, and the curvature radius of the image-side surface 122 of the second lens element 120 is R4, the following condition is satisfied: (R3+R4)/(R3−R4)=1.49.

In the optical lens assembly according to the 1st embodiment, when the focal length of the optical lens assembly is f, a focal length of the first lens element 110 is f1, and a focal length of the second lens element 120 is f2, the following condition is satisfied: |f/f1|+|f/f2|=3.38.

In the optical lens assembly according to the 1st embodiment, when an axial distance between the aperture stop 100 and the image-side surface 132 of the third lens element 130 is SD, and an axial distance between the object-side surface 111 of the first lens element 110 and the image-side surface 132 of the third lens element 130 is TD, the following condition is satisfied: SD/TD=0.84.

In the optical lens assembly according to the 1st embodiment, when the axial distance between the object-side surface 111 of the first lens element 110 and the image-side surface 132 of the third lens element 130 is TD, and the focal length of the optical lens assembly is f, the following condition is satisfied: TD/f=0.59.

In the optical lens assembly according to the 1st embodiment, when the focal length of the optical lens assembly is f, and a maximum image height of the optical lens assembly is ImgH, the following condition is satisfied: f/ImgH=3.10.

In the optical lens assembly according to the 1st embodiment, when an entrance pupil diameter of the optical lens assembly is EDP, and the maximum image height of the optical lens assembly is ImgH, the following condition is satisfied: EPD/ImgH=1.22.

In the optical lens assembly according to the 1st embodiment, when an axial distance between the object-side surface 111 of the first lens element 110 and the image surface 150 is TL, and the maximum image height of the optical lens assembly is ImgH, the following condition is satisfied: TL/ImgH=2.95.

The detail optical data of the 1st embodiment are shown in Table 1 and the aspheric surface data are shown in Table 2 below.

TABLE 1

1st Embodiment
f = 6.20 mm, Fno = 2.55, HFOV = 17.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.585 | | | | |
| 2 | Lens 1 | 1.525 | ASP | 0.727 | Plastic | 1.535 | 55.7 | 3.14 |
| 3 | | 13.991 | ASP | 0.112 | | | | |
| 4 | Lens 2 | 11.280 | ASP | 0.908 | Plastic | 1.650 | 21.4 | −4.41 |
| 5 | | 2.214 | ASP | 1.187 | | | | |
| 6 | Lens 3 | −2.163 | ASP | 0.726 | Plastic | 1.650 | 21.4 | −46.84 |
| 7 | | −2.636 | ASP | 0.500 | | | | |
| 8 | IR-filter | Plano | | 0.320 | Glass | 1.517 | 64.2 | — |
| 9 | | Plano | | 1.411 | | | | |
| 10 | Image | Plano | | — | | | | |

Note:
Reference wavelength is 587.6 nm (d-line).

TABLE 2

Aspheric Coefficients

| | Surface # | | |
|---|---|---|---|
| | 2 | 3 | 4 |
| k= | −8.2205E−01 | 5.0845E+01 | 4.3548E+01 |
| A4= | 1.6956E−02 | 2.5999E−03 | 1.6154E−03 |
| A6= | 3.3935E−02 | −9.0941E−03 | 5.5083E−03 |
| A8= | −4.4661E−02 | 2.7311E−03 | −1.6720E−02 |
| A10= | 3.3323E−02 | 1.4068E−02 | 2.6529E−02 |
| A12= | −7.8128E−03 | −8.3165E−03 | −1.3024E−02 |

| | Surface # | | |
|---|---|---|---|
| | 5 | 6 | 7 |
| k= | −6.3220E+01 | 2.1877E+00 | 3.3979E−01 |
| A4= | 7.1906E−01 | −2.8926E−02 | −2.3707E−02 |
| A6= | −2.4242E+00 | −6.1637E−02 | −2.6920E−02 |
| A8= | 6.9441E+00 | 1.5025E−01 | 3.6546E−02 |
| A10= | −1.1589E+01 | −1.7933E−01 | −2.9948E−02 |
| A12= | 1.0320E+01 | 8.9214E−02 | 1.1174E−02 |
| A14= | −3.6147E+00 | −2.5449E−04 | −1.5638E−03 |

In Table 1, the curvature radius, the thickness, and the focal length are shown in millimeter (mm). Surface number 0-10 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
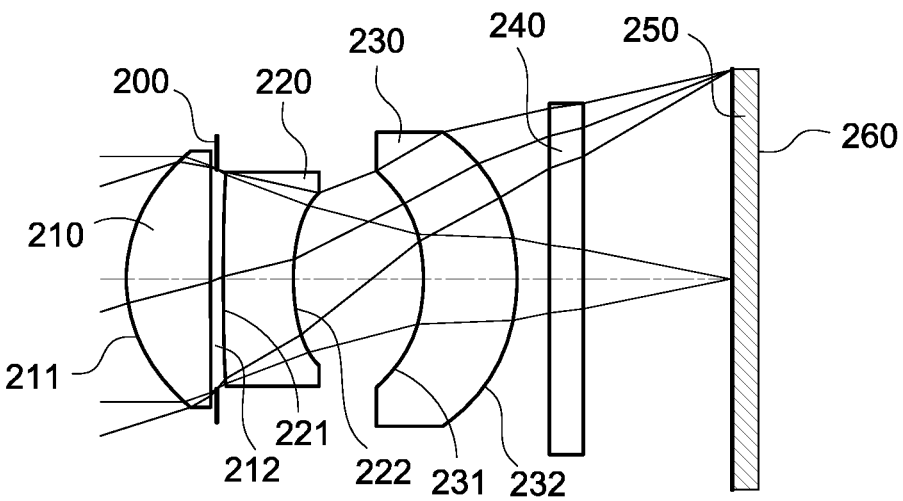
FIG. 3 is a schematic view of an image capturing device according to the 2nd embodiment of the present disclosure.
Figure 4:
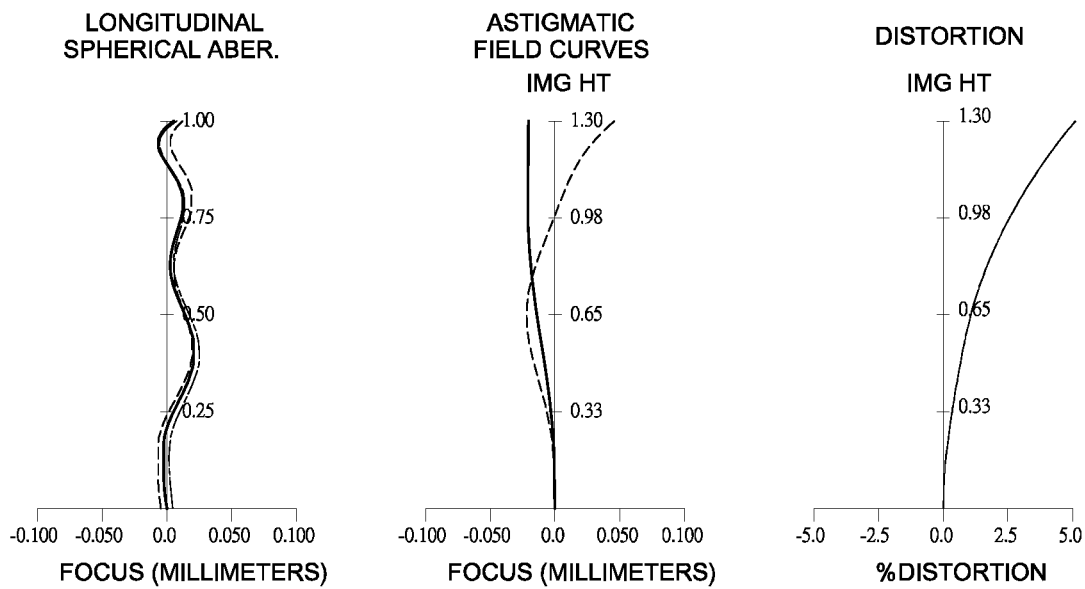
FIG. 4 shows spherical aberration curves, astigmatic field curves, and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves, and a distortion curve of the image capturing device according to the 2nd embodiment. In FIG. 3, the image capturing device includes an optical lens assembly (its refer numeral is omitted) and an image sensor 260. The optical lens assembly includes, in order from an object side to an image side, a first lens element 210, an aperture stop 200, a second lens element 220, a third lens element 230, an IR-filter 240, and an image surface 250. The image sensor 260 is located at the image surface 250 of the optical lens assembly. The optical lens assembly has a total of three lens elements (210-230) with refractive power, and the first lens element 210, the second lens element 220, and the third lens element 230 are independent and non-cemented lens elements.

The first element 210 with positive refractive power has an object-side surface 211 being convex and an image-side surface 212 being concave. The first lens element 210 is made of plastic material and has the object-side surface 211 and the image-side surface 212 being both aspheric. The image-side surface 211 of the first lens element 210 has the largest curvature of all surfaces of lens elements in the optical lens assembly.

The second lens element 220 with negative power refractive has an object-side surface 221 being convex and an image-side surface 222 being concave. The second lens element 220 is made of plastic material and the object-side surface 221 and the image-side surface 222 being both aspheric. A curvature of the image-side surface 222 of the second lens element 220 is increasingly concave from a paraxial region to an off-axis region thereof, and the image-side surface 212 of the first lens element 210 and the object-side surface 221 of the second lens element 220 have the smallest curvature of all surfaces of lens elements in the optical lens assembly.

The third lens element 230 with positive refractive power has an object-side surface 231 being concave and an image-side surface 232 being convex. The third lens element 230 is made of plastic material and the object-side surface 231 and the image-side surface 232 are both aspheric. A curvature of the object-side surface 231 of the third lens element 230 is increasingly concave from a paraxial region to an off-axis region thereof.

The IR-filter 240 is made of glass material and located between the third lens element 230 and the image surface 250, and will not affect a focal length of the optical lens assembly.

The detailed optical data of the 2nd embodiment are shown in Table 3 and the aspheric surface data are shown in Table 4 below.

TABLE 3

2nd Embodiment
f = 3.88 mm, Fno = 2.55, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.948 | ASP | 0.521 | Plastic | 1.544 | 55.9 | 1.81 |
| 2 | | 19.628 | ASP | 0.040 | | | | |
| 3 | Ape. Stop | Plano | | 0.040 | | | | |
| 4 | Lens 2 | 15.631 | ASP | 0.435 | Plastic | 1.639 | 23.5 | −2.44 |
| 5 | | 1.402 | ASP | 0.808 | | | | |
| 6 | Lens 3 | −1.102 | ASP | 0.580 | Plastic | 1.614 | 25.6 | 105.84 |
| 7 | | −1.301 | ASP | 0.200 | | | | |
| 8 | IR-filter | Plano | | 0.210 | Glass | 1.517 | 64.2 | — |
| 9 | | Plano | | 0.923 | | | | |
| 10 | Image | Plano | | — | | | | |

Note:
Reference wavelength is 587.6 nm (d-line).

TABLE 4

Aspheric Coefficients

| Surface # | | | |
|---|---|---|---|
| | 1 | 2 | 4 |
| k= | −8.0120E−01 | 3.8512E+01 | −6.8783E+01 |
| A4= | 6.5650E−02 | −4.9348E−02 | −2.4327E−02 |
| A6= | 3.2079E−01 | −6.7973E−02 | 2.1246E−02 |
| A8= | −9.5614E−01 | 3.7366E−02 | −1.3059E−01 |
| A10= | 1.5990E+00 | 6.4102E−01 | 1.5257E+00 |
| A12= | −9.9983E−01 | −7.4734E−01 | −1.7160E+00 |

| Surface # | | | |
|---|---|---|---|
| | 5 | 6 | 7 |
| k= | −6.1677E+01 | 1.0694E+00 | −4.7100E−01 |
| A4= | 2.7293E+00 | −1.3622E−01 | −8.3913E−02 |
| A6= | −2.1292E+01 | −4.5937E−01 | −2.9285E−01 |
| A8= | 1.4514E+02 | 2.4984E+00 | 8.7166E−01 |
| A10= | −5.8020E+02 | −7.7323E+00 | −1.6137E+00 |
| A12= | 1.2666E+03 | 9.8472E+00 | 1.3880E+00 |
| A14= | −1.0836E+03 | 3.2278E+00 | −4.5135E−01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.88 | R5/f | −0.28 |
| Fno | 2.55 | |(R2 + R3)/(R2 − R3)| | 8.82 |
| HFOV [deg.] | 17.6 | (R3 + R4)/(R3 − R4) | 1.20 |
| (V2 + V3)/V1 | 0.88 | |f/f1| + |f/f2| | 3.73 |
| CT1/CT2 | 1.20 | SD/TD | 0.77 |
| (CT2 + CT3)/CT1 | 1.95 | TD/f | 0.62 |
| T12/CT2 | 0.18 | f/ImgH | 2.99 |
| T12/T23 | 0.10 | EPD/ImgH | 1.17 |
| R1/f | 0.24 | TL/ImgH | 2.89 |
| f/R4 | 2.77 | | |

3rd Embodiment

Figure 5:
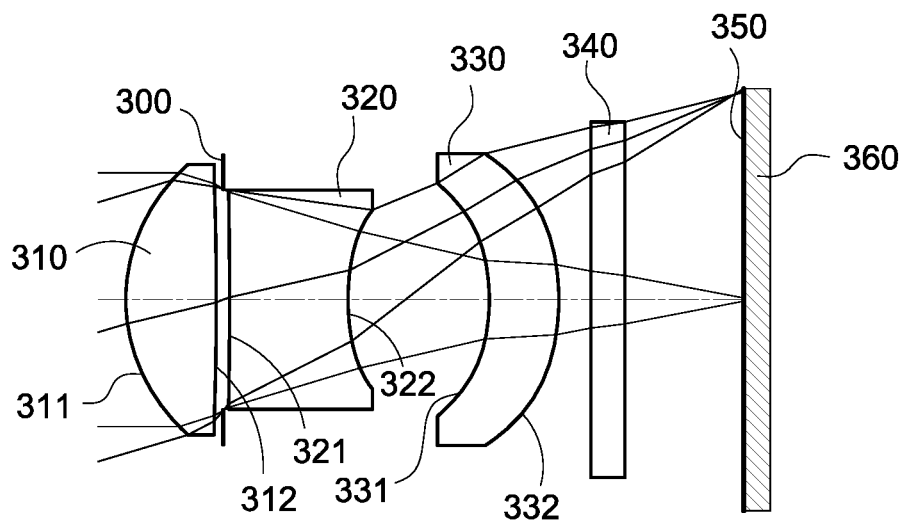
FIG. 5 is a schematic view of an image capturing device according to the 3rd embodiment of the present disclosure.
Figure 6:
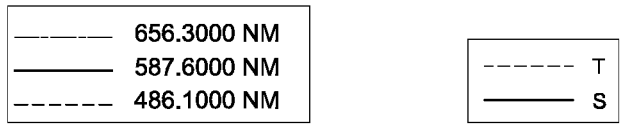
FIG. 6 shows spherical aberration curves, astigmatic field curves, and a distortion curve of the image capturing device according to the 3rd embodiment.
Figure 6:
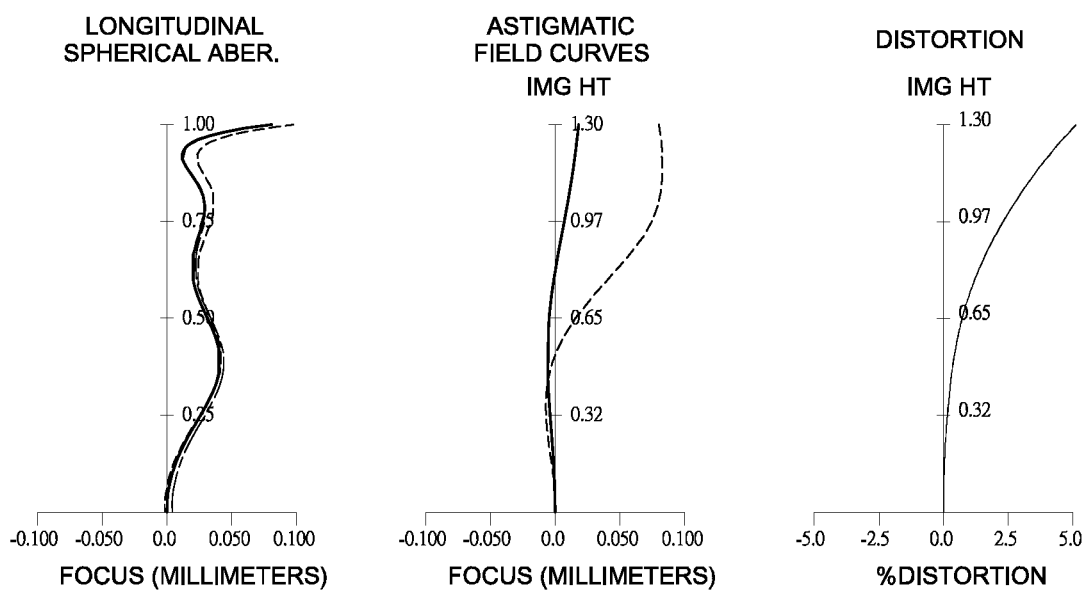

FIG. 5 is a schematic view of an image capturing device according to the 3rd embodiment of the present disclosure. FIG. 6 shows, in order from left to right, spherical aberration curves, astigmatic field curves, and a distortion curve of the image capturing device according to the 3rd embodiment. In FIG. 5, the image capturing device includes an optical lens assembly (its reference numeral is omitted) and an image sensor 360. The optical lens assembly includes, in order from an object side to an image side, a first lens element 310, an aperture stop 300, a second lens element 320, a third lens element 330, an IR-filter 340, and an image surface 350, wherein the image sensor 360 is located at the image surface 350 of the optical lens assembly. The optical lens assembly has a total of three lens elements (310-330) with refractive power, and the first lens element 310, the second lens element 320, and the third lens element 330 are independent and non-cemented lens elements.

The first lens element 310 with positive refractive power has an object-side surface 311 being convex and an image-side surface 312 being convex. The first lens element 310 is made of plastic material and the object-side surface 311 and the image-side surface 312 are both aspheric. The object-side surface 311 of the first lens element 310 has the largest curvature of all surfaces of lens elements in the optical lens assembly.

The second lens element 320 with negative refractive power has an object-side surface 321 being concave and an image-side surface 322 being concave. The second lens element 320 is made of plastic material and has the object-side surface 321 and the image-side surface 322 being both aspheric. A curvature of the image-side surface 322 of the second lens element 320 is increasingly concave from a paraxial region to an off-axis region thereof, and the image-side surface 312 of the first lens element 310 and the object-side surface 321 of the second lens element 320 have the smallest curvature of all surfaces of lens elements in the optical lens assembly.

The third lens element 330 with negative refractive power has an object-side surface 331 being concave and an image-side surface 332 being convex. The third lens element 330 is made of plastic material has the object-side surface 331 and the imaging side-surface 332 being both aspheric. A curvature of the object-side surface 331 of the third lens element 330 is increasingly concave from a paraxial region to an off-axis region thereof.

The IR-filter 340 is made of glass and located between the third lens element 330 and the image surface 350, and will not affect a focal length of the optical lens assembly.

The detailed optical data of the 3rd embodiment are shown in Table 5 and the aspheric surface data are shown in Table 6 below.

TABLE 5

3rd Embodiment
f = 4.10 mm, Fno = 2.60, HFOV =16.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.071 | ASP | 0.562 | Plastic | 1.544 | 55.9 | 1.89 |
| 2 | | −21.834 | ASP | 0.042 | | | | |
| 3 | Ape. Stop | Plano | | 0.040 | | | | |
| 4 | Lens 2 | −49.982 | ASP | 0.734 | Plastic | 1.639 | 23.5 | −2.19 |
| 5 | | 1.450 | ASP | 0.877 | | | | |
| 6 | Lens 3 | −1.296 | ASP | 0.430 | Plastic | 1.614 | 25.6 | −44.14 |
| 7 | | −1.533 | ASP | 0.200 | | | | |

TABLE 5-continued

3rd Embodiment
f = 4.10 mm, Fno = 2.60, HFOV =16.6 deg.

| Surface # | | Curvature Radius | Thickness | Material | Index | Abbe # | Focal Length |
|---|---|---|---|---|---|---|---|
| 8 | IR-filter | Plano | 0.210 | Glass | 1.517 | 64.2 | — |
| 9 | | Plano | 0.738 | | | | |
| 10 | Image | Plano | — | | | | |

Note:
Reference wavelength is 587.6 nm (d-line).

TABLE 6

Aspheric Coefficients

| | Surface # | | |
|---|---|---|---|
| | 1 | 2 | 4 |
| k= | −9.5300E−01 | −2.8807E+01 | 9.0000E+01 |
| A4= | 4.6598E−02 | −1.4902E−02 | −2.5988E−02 |
| A6= | 2.9162E−01 | 3.3203E−02 | 1.0968E−01 |
| A8= | −8.8018E−01 | 9.2165E−02 | −2.2558E−01 |
| A10= | 1.4400E+00 | −2.0531E−01 | 4.0544E−01 |
| A12= | −8.4453E−01 | 2.5333E−02 | −4.7403E−01 |

| | Surface # | | |
|---|---|---|---|
| | 5 | 6 | 7 |
| k= | −6.1739E+01 | 1.5098E+00 | 3.4679E−01 |
| A4= | 2.5578E+00 | −2.0719E−01 | −1.6727E−01 |
| A6= | −2.1221E+01 | −5.5605E−01 | −2.1222E−01 |
| A8= | 1.4656E+02 | 3.2986E+00 | 8.0169E−01 |
| A10= | −5.9063E+02 | −1.0241E+01 | −1.5422E+00 |
| A12= | 1.2666E+03 | 1.3739E+01 | 1.1937E+00 |
| A14= | −1.0836E+03 | −3.3679E+00 | −2.8380E−01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.10 | R5/f | −0.32 |
| Fno | 2.60 | |(R2 + R3)/(R2 − R3)| | 2.55 |
| HFOV [deg.] | 16.6 | (R3 + R4)/(R3 − R4) | 0.94 |
| (V2 + V3)/V1 | 0.88 | |f/f1| + |f/f2| | 4.03 |
| CT1/CT2 | 0.77 | SD/TD | 0.78 |
| (CT2 + CT3)/CT1 | 2.08 | TD/f | 0.66 |
| T12/CT2 | 0.11 | f/ImgH | 3.16 |
| T12/T23 | 0.09 | EPD/ImgH | 1.22 |
| R1/f | 0.26 | TL/ImgH | 2.96 |
| f/R4 | 2.83 | | |

4th Embodiment

Figure 7:
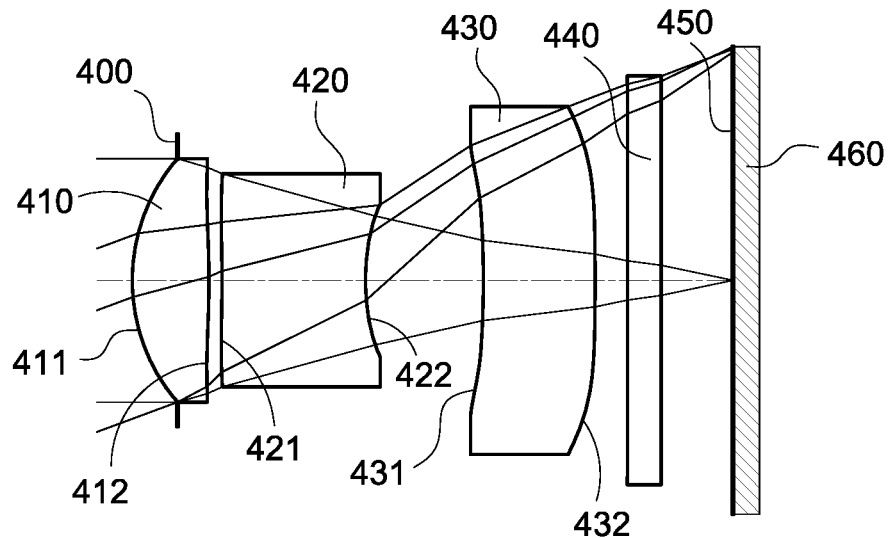
FIG. 7 is a schematic view of an image capturing device according to the 4th embodiment of the present disclosure.
Figure 8:
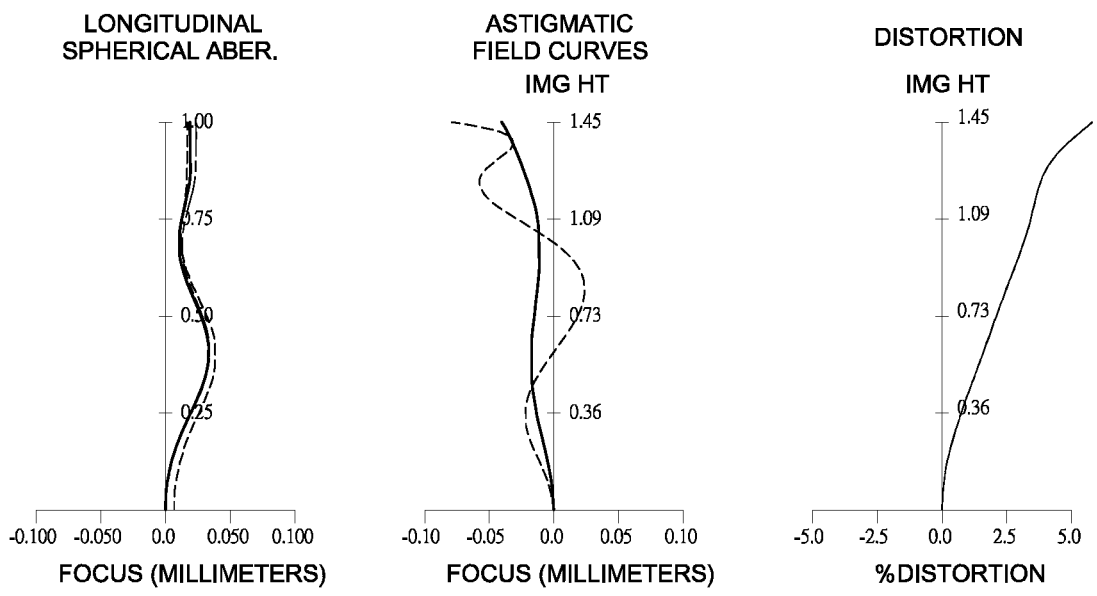
FIG. 8 shows spherical aberration curves, astigmatic field curves, and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves, and a distortion curve of the image capturing device according to the 4th embodiment. In FIG. 7, the image capturing device includes an optical lens assembly (its reference numeral is omitted) and an image sensor 460. The optical lens assembly includes, from an object side to an image side, an aperture stop 400, a first lens element 410, a second lens element 420, a third lens element 430, an IR-filter 440, and an image surface 450, wherein the image sensor 460 is located at the image surface 450 of the optical lens assembly. The optical lens assembly has a total number of three lens elements (410-430) with refractive power, and the first lens element 410, the second lens element 420, and the third lens element 430 are independent and non-cemented lens elements.

The first lens element 410 with positive refractive power has an object-side surface 411 being convex and an imaging-side surface 412 being convex. The first lens element 410 is made of plastic material and has the object-side surface 411 and the image-side surface 412 being both aspheric. The image-side surface 411 of the first lens element 410 has the largest curvature of all surfaces of lens elements in the optical lens assembly.

The second lens element 420 with negative refractive power has an object-side surface 421 being concave and an image-side surface 422 being concave. The second lens element 420 is made of plastic material and has the object-side surface 421 and the image-side surface 422 being both aspheric. A curvature of the image-side surface 422 of the second lens element 420 is increasingly concave from a paraxial region to an off-axis region thereof. The image-side surface 412 of the first lens element 410 and the object-side surface 421 of the second lens element 420 have the smallest curvature of all surfaces of lens elements in the optical lens assembly.

The third lens element 430 with negative refractive power has an object-side surface 431 being concave and an image-side surface 432 being convex. The third lens element 430 is made of plastic material and has the object-side surface 431 and the image-side surface 432 being both aspheric. A curvature of the object-side surface 431 of the third lens element 430 is increasingly concave from a paraxial region to an off-axis region thereof.

The IR-filter 440 is made of glass material and located between the third lens element 430 and the image surface 450, and will not affect a focal length of the optical lens assembly.

The detailed optical data of the 4th embodiment are shown in Table 7 and the aspheric surface data are shown in Table 8 below.

TABLE 7

4th Embodiment
f = 3.67 mm, Fno = 2.43, HFOV = 20.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.280 | | | | |
| 2 | Lens 1 | 1.144 | ASP | 0.476 | Plastic | 1.544 | 55.9 | 1.79 |
| 3 | | −5.629 | ASP | 0.080 | | | | |
| 4 | Lens 2 | −10.909 | ASP | 0.891 | Plastic | 1.639 | 23.5 | −2.04 |
| 5 | | 1.530 | ASP | 0.730 | | | | |
| 6 | Lens 3 | −8.722 | ASP | 0.694 | Plastic | 1.639 | 23.5 | −25.35 |
| 7 | | −19.481 | ASP | 0.000 | | | | |
| 8 | Stop | Plano | | 0.200 | | | | |
| 9 | IR-filter | Plano | | 0.210 | Glass | 1.517 | 64.2 | — |
| 10 | | Plano | | 0.445 | | | | |
| 11 | Image | Plano | | — | | | | |

Note:
Reference wavelength is 587.6 nm (d-line).
Effective radius of Surface 8 is 1.143 mm.

TABLE 8

Aspheric Coefficients

| | Surface # | | |
|---|---|---|---|
| | 2 | 3 | 4 |
| k= | −1.0377E+00 | −5.3155E+01 | 9.0000E+01 |
| A4= | 3.3692E−02 | 1.0478E−01 | 1.3918E−01 |
| A6= | 3.1509E−01 | 3.8199E−02 | 9.6230E−02 |
| A8= | −9.9460E−01 | −1.9832E−01 | −4.1739E−01 |
| A10= | 1.7197E+00 | 8.2316E−01 | 8.2958E−01 |
| A12= | −9.8790E−01 | −1.0114E+00 | −1.0153E+00 |

| | Surface # | | |
|---|---|---|---|
| | 5 | 6 | 7 |
| k= | −7.4101E+01 | 9.3183E+00 | 6.5346E+01 |
| A4= | 2.5404E+00 | 9.6762E−03 | 4.6102E−02 |
| A6= | −2.1470E+01 | −1.0889E+00 | −6.7214E−01 |
| A8= | 1.4803E+02 | 3.8971E+00 | 1.4048E+00 |
| A10= | −5.9528E+02 | −7.6961E+00 | −1.6242E+00 |
| A12= | 1.2666E+03 | 8.4045E+00 | 9.6282E−01 |
| A14= | −1.0836E+03 | −3.6295E+00 | −2.2096E−01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.67 | R5/f | −2.37 |
| Fno | 2.43 | \|(R2 + R3)/(R2 − R3)\| | 3.13 |
| HFOV [deg.] | 20.3 | (R3 + R4)/(R3 − R4) | 0.75 |
| (V2 + V3)/V1 | 0.84 | \|f/f1\| + \|f/f2\| | 3.85 |
| CT1/CT2 | 0.53 | SD/TD | 0.90 |
| (CT2 + CT3)/CT1 | 3.33 | TD/f | 0.78 |
| T12/CT2 | 0.09 | f/ImgH | 2.53 |
| T12/T23 | 0.11 | EPD/ImgH | 1.04 |
| R1/f | 0.31 | TL/ImgH | 2.57 |
| f/R4 | 2.40 | | |

5th Embodiment

Figure 9:
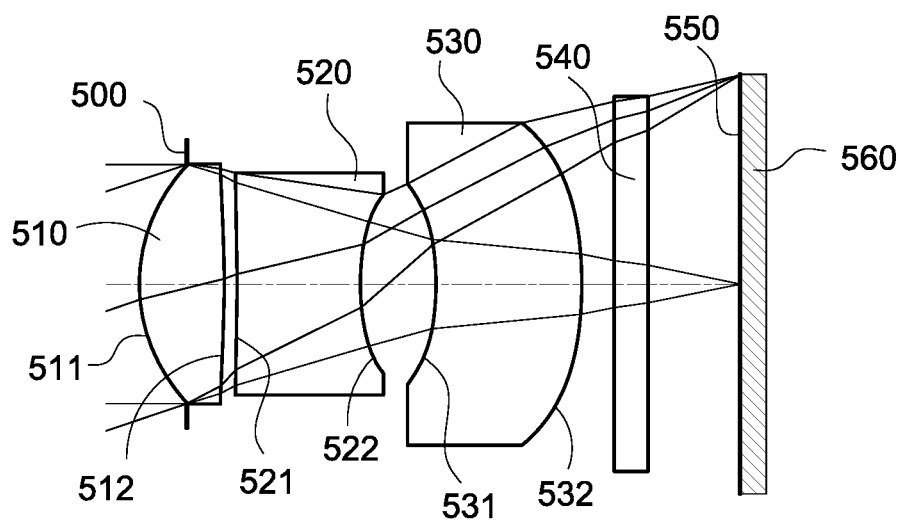
FIG. 9 is a schematic view of an image capturing device according to the 5th embodiment of the present disclosure.
Figure 10:
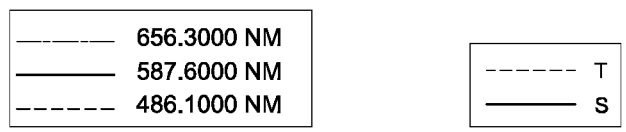
FIG. 10 shows spherical aberration curves, astigmatic field curves, and a distortion curve of the image capturing device according to the 5th embodiment.
Figure 10:
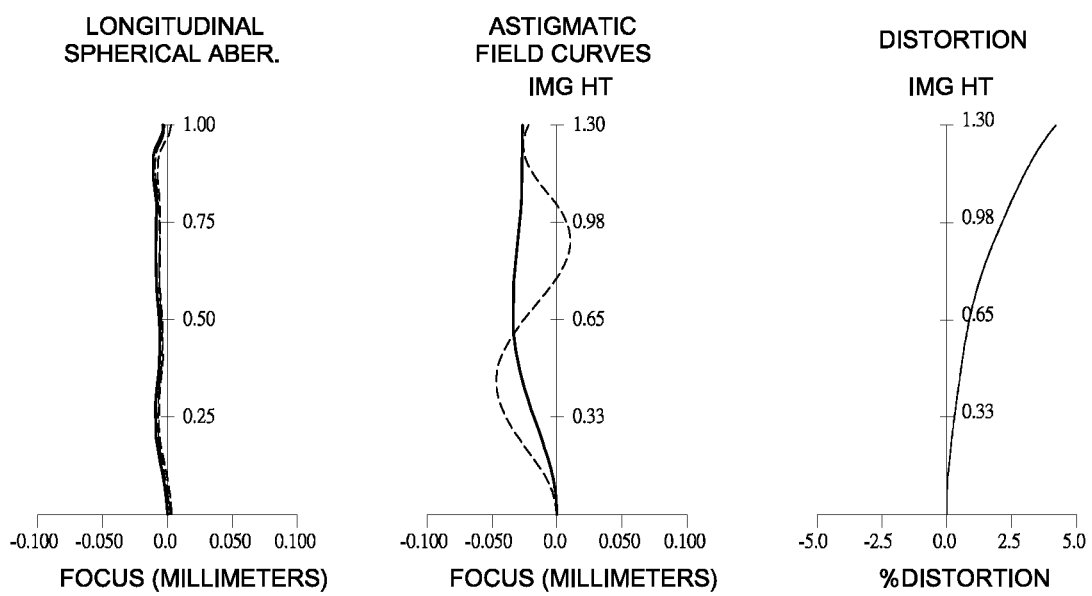

FIG. 9 is a schematic view of an image capturing device according to the 5th embodiment of the present disclosure. FIG. 10 shows, in order from left to right, spherical aberration curves, astigmatic field curves, and a distortion curve of the image capturing device according to the 5th embodiment. In FIG. 9, the image capturing device includes an optical lens assembly (its reference numeral is omitted) and an image sensor 560. The optical lens assembly includes, from an object side to an image side, an aperture stop 500, a first lens element 510, a second lens element 520, a third lens element 530, an IR-filter 540, and an image surface 550, wherein the image sensor 560 is located at the image surface 550. The optical lens assembly has a total of three lens elements (510-530) with refractive power, and the first lens element 510, the second lens element 520, and the third lens element 530 are independent and non-cemented lens elements.

The first lens element 510 with positive refractive power has an objective-side surface 511 being convex and an image-side surface 512 being convex. The first lens element 510 is made of plastic material and has the object-side surface 511 and the image-side surface 512 being both aspheric. The object-side surface 511 of the first lens element 510 has the largest curvature of all surfaces of lens elements in the optical lens assembly.

The second lens element 520 with negative refractive power has an object-side surface 521 being concave and an image-side surface 522 being concave. The second lens element 520 is made of plastic material and has the object-side surface 521 and the image-side surface 522 being both aspheric. A curvature of the image-side surface 522 of the second lens element 520 is increasingly concave from a paraxial region to an off-axis region thereof, and the image-side surface 512 of the first lens element 510 and the object-side surface 521 of the second lens element 520 have the smallest curvature of all surfaces of lens elements in the optical lens assembly.

The third lens element 530 with negative refractive power has an object-side surface 531 being concave and an image-side surface 532 being convex. The third lens element 530 is made of plastic material and has the object-side surface 531 and the image-side surface 532 being both aspheric. A curvature of the object-side surface 531 of the third lens element 530 is increasingly concave from a paraxial region to an off-axis region thereof.

The IR-filter 540 is made of glass material and located between the third lens element 530 and the image surface 550, and will not affect a focal length of the optical lens assembly.

The detailed optical data of the 5th embodiment are shown in Table 9 and the aspheric surface data are shown in Table 10 below.

TABLE 9

5th Embodiment
f = 3.71 mm, Fno = 2.50, HFOV = 18.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.295 | | | | |
| 2 | Lens 1 | 1.045 | ASP | 0.527 | Plastic | 1.544 | 55.9 | 1.69 |
| 3 | | −6.397 | ASP | 0.080 | | | | |
| 4 | Lens 2 | −10.940 | ASP | 0.765 | Plastic | 1.639 | 23.5 | −2.06 |
| 5 | | 1.540 | ASP | 0.468 | | | | |
| 6 | Lens 3 | −1.778 | ASP | 0.905 | Plastic | 1.583 | 30.2 | −26.58 |
| 7 | | −2.384 | ASP | 0.200 | | | | |
| 8 | IR-filter | Plano | | 0.210 | Glass | 1.517 | 64.2 | — |
| 9 | | Plano | | 0.571 | | | | |
| 10 | Image | Plano | | — | | | | |

Note:
Reference wavelength is 587.6 nm (d-line).

TABLE 10

Aspheric Coefficients

| | Surface # | | |
|---|---|---|---|
| | 2 | 3 | 4 |
| k= | −8.6676E−01 | −9.2674E+00 | 9.0000E+01 |
| A4= | 4.9625E−02 | 9.1615E−02 | 8.4067E−02 |
| A6= | 2.9420E−01 | −1.0048E−02 | 3.1589E−02 |
| A8= | −9.5789E−01 | −2.7309E−01 | −4.1253E−01 |
| A10= | 1.7697E+00 | 8.4430E−01 | 1.0444E+00 |
| A12= | −1.1649E+00 | −9.4767E−01 | −1.1491E+00 |

| | Surface # | | |
|---|---|---|---|
| | 5 | 6 | 7 |
| k= | −9.0000E+01 | 5.0852E+00 | −5.7943E−02 |
| A4= | 2.5904E+00 | −1.8619E−01 | −5.6141E−02 |
| A6= | −2.1869E+01 | −6.6358E−01 | −3.8961E−01 |
| A8= | 1.4757E+02 | 3.8243E+00 | 1.0387E+00 |
| A10= | −5.8822E+02 | −1.1742E+01 | −1.5453E+00 |
| A12= | 1.2667E+03 | 5.1203E+00 | 1.1266E+00 |
| A14= | −1.0836E+03 | 2.6862E+01 | −3.2690E−01 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.71 | R5/f | −0.48 |
| Fno | 2.50 | \|(R2 + R3)/(R2 − R3)\| | 3.82 |
| HFOV [deg.] | 18.6 | (R3 + R4)/(R3 − R4) | 0.75 |
| (V2 + V3)/V1 | 0.96 | \|f/f1\| + \|f/f2\| | 3.99 |
| CT1/CT2 | 0.69 | SD/TD | 0.89 |
| (CT2 + CT3)/CT1 | 3.17 | TD/f | 0.74 |
| T12/CT2 | 0.11 | f/ImgH | 2.85 |
| T12/T23 | 0.17 | EPD/ImgH | 1.14 |
| R1/f | 0.28 | TL/ImgH | 2.87 |
| f/R4 | 2.41 | | |

6th Embodiment

Figure 11:
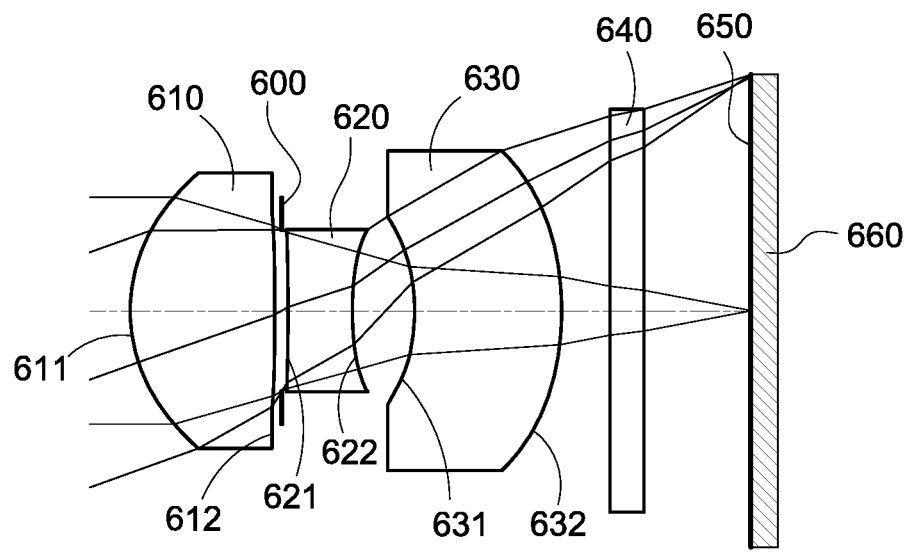
FIG. 11 is a schematic view of an image capturing device according to the 6th embodiment of the present disclosure.
Figure 12:
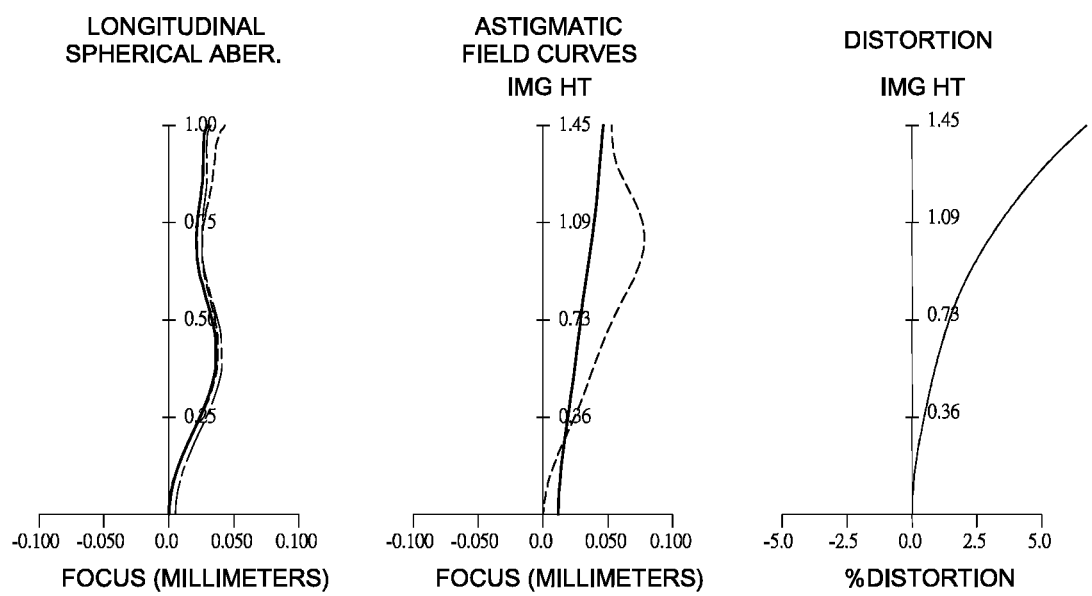
FIG. 12 shows spherical aberration curves, astigmatic field curves, and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves, and a distortion curve of the image capturing device according to the 6th embodiment. In FIG. 11, the image capturing device includes an optical lens assembly (its reference numeral is omitted) and an image sensor 660. The optical lens assembly includes, in order from an object side to an image side, a first lens element 610, an aperture stop 600, a second lens element 620, a third lens element 630, an IR-filter 640, and an image surface 650, wherein the image sensor 660 is located at the image surface 650. The optical lens assembly has a total of three lens elements (610-630), and the first lens element 610, the second lens element 620, and the third lens element 630 are independent and non-cemented lens elements.

The first lens element 610 with positive refractive power has an object-side surface 611 being convex and an image-side surface 612 being convex. The first lens element 610 is made of plastic and has the object-side surface 611 and the image-side surface 612 being both aspheric. The object-side surface 611 of the first lens element 610 has the largest curvature of all surfaces of lens elements in the optical lens assembly.

The second lens element 620 with negative refractive power has an object-side surface 621 being concave and an image-side surface 622 being concave. The second lens element 620 is made of plastic material and has the object-side surface 621 and the image-side surface 622 being both aspheric. A curvature of the image-side surface 622 of the second lens element 620 is increasingly concave from a paraxial region to an off-axis region thereof, and the image-side surface 612 of the first lens element 610 and the object-side surface 621 of the second lens element 620 have the smallest curvature of all surfaces of lens elements in the optical lens assembly.

The third lens element 630 with negative refractive power has an object-side surface 631 being concave and an image-side surface 632 being convex. The third lens element 630 is made of plastic material and has the object-side surface 631 and the image-side surface 632 being both aspheric. A curvature of the object-side surface 631 of the third lens element 630 is increasingly concave from a paraxial region to an off-axis region thereof.

The IR-filter 640 is made of glass material and is located between the third lens element 630 and the image surface 650, and will not affect a focal length of the optical lens assembly.

The detailed optical data of the 6th embodiment are shown in Table 11 and the aspheric surface data are shown in Table 12 below.

are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.74 | R5/f | −0.36 |
| Fno | 2.65 | \|(R2 + R3)/(R2 − R3)\| | 6.44 |
| HFOV [deg.] | 19.8 | (R3 + R4)/(R3 − R4) | 0.83 |
| (V2 + V3)/V1 | 0.77 | \|f/f1\| + \|f/f2\| | 3.42 |
| CT1/CT2 | 2.25 | SD/TD | 0.65 |
| (CT2 + CT3)/CT1 | 1.46 | TD/f | 0.72 |
| T12/CT2 | 0.21 | f/ImgH | 2.58 |
| T12/T23 | 0.22 | EPD/ImgH | 0.97 |
| R1/f | 0.27 | TL/ImgH | 2.66 |
| f/R4 | 1.92 | | |

TABLE 11

6th Embodiment
f = 3.74 mm, Fno = 2.65, HFOV = 19.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.019 | ASP | 0.897 | Plastic | 1.544 | 55.9 | 1.83 |
| 2 | | −29.138 | ASP | 0.043 | | | | |
| 3 | Ape. Stop | Plano | | 0.040 | | | | |
| 4 | Lens 2 | −21.304 | ASP | 0.398 | Plastic | 1.650 | 21.4 | −2.72 |
| 5 | | 1.942 | ASP | 0.386 | | | | |
| 6 | Lens 3 | −1.327 | ASP | 0.913 | Plastic | 1.650 | 21.5 | −20.02 |
| 7 | | −1.878 | ASP | 0.300 | | | | |
| 8 | IR-filter | Plano | | 0.210 | Glass | 1.517 | 64.2 | — |
| 9 | | Plano | | 0.664 | | | | |
| 10 | Image | Plano | | — | | | | |

Note:
Reference wavelength is 587.6 nm (d-line).

TABLE 12

Aspheric Coefficients

| | Surface # | | |
|---|---|---|---|
| | 1 | 2 | 4 |
| k= | −8.4746E−01 | 8.9755E+01 | 2.9088E+01 |
| A4= | 6.0185E−02 | −4.0702E−02 | −3.5025E−02 |
| A6= | 2.3180E−01 | 1.9275E−02 | 1.8905E−02 |
| A8= | −7.1377E−01 | −2.0031E−01 | 1.6390E−01 |
| A10= | 1.2625E+00 | −1.1922E+00 | −2.7786E+00 |
| A12= | −8.3928E−01 | 2.3049E+00 | 5.0390E+00 |

| | Surface # | | |
|---|---|---|---|
| | 5 | 6 | 7 |
| k= | −9.0000E+01 | 2.0093E+00 | −9.3330E−01 |
| A4= | 1.8765E+00 | −1.6625E−01 | −5.2710E−02 |
| A6= | −1.6625E+01 | −5.7407E−01 | −2.7752E−01 |
| A8= | 1.2879E+02 | 3.3326E+00 | 8.3666E−01 |
| A10= | −5.5827E+02 | −1.1696E+01 | −1.4095E+00 |
| A12= | 1.2666E+03 | 1.8123E+01 | 1.1764E+00 |
| A14= | −1.0836E+03 | 2.3398E+01 | −3.8722E−01 |

Figure 13:
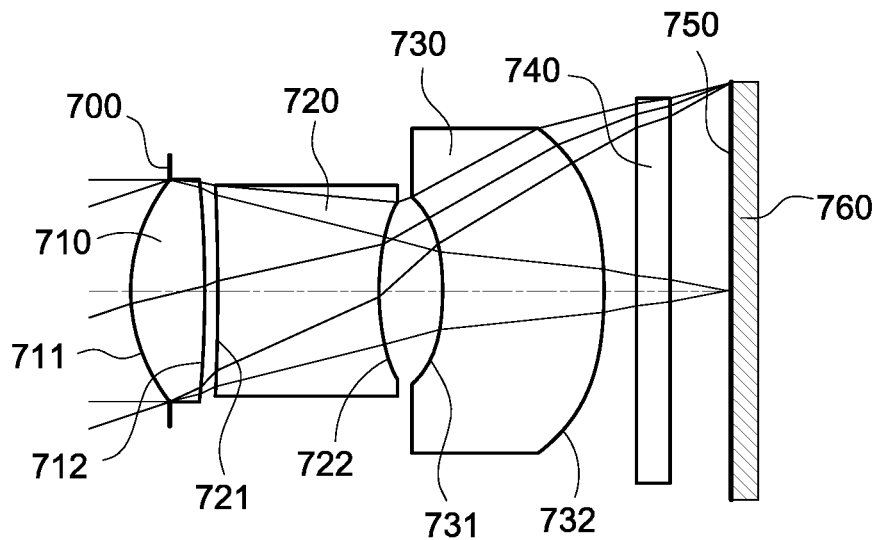
FIG. 13 is a schematic view of an image capturing device according to the 7th embodiment of the present disclosure.
Figure 14:
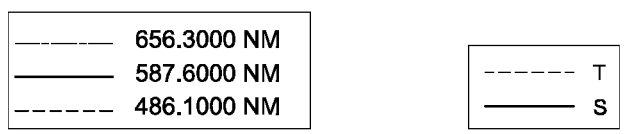
FIG. 14 shows spherical aberration curves, astigmatic field curves, and a distortion curve of the image capturing device according to the 7th embodiment.
Figure 14:
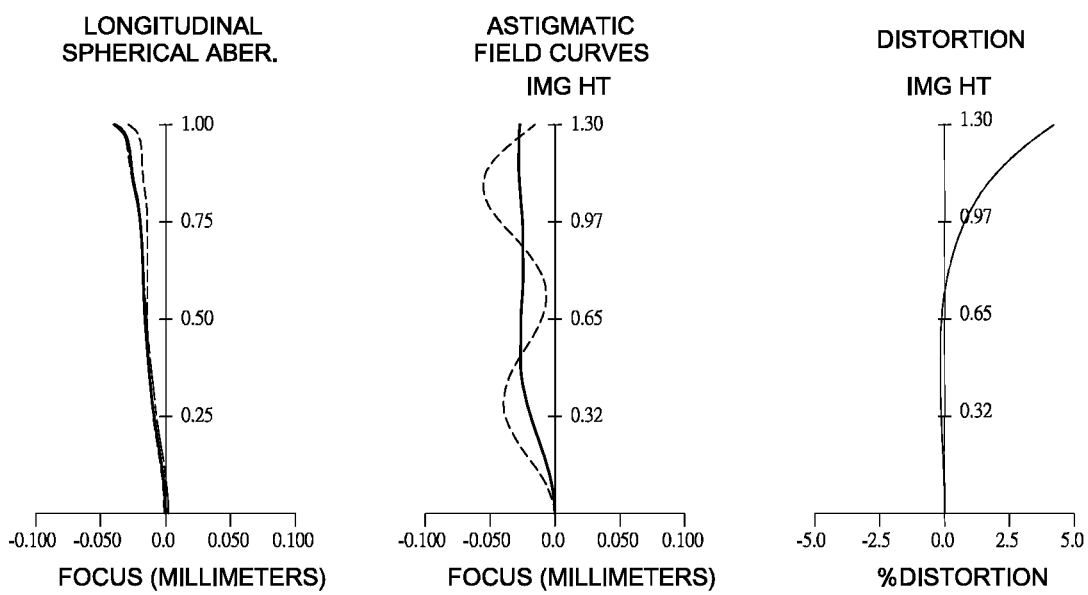

In the 6th embodiment, the equation of the aspheric surface profiles of the aforementioned lens elements is the same as the equation of the 1st embodiment. Also, the definitions of these parameters shown in the following table 7th Embodiment FIG. 13 is a schematic view of an image capturing device according to the 7th embodiment of the present disclosure. FIG. 14 shows, in order from left to right, spherical aberration curves, astigmatic field curves, and a distortion curve of the image capturing device according to the 7th embodiment. In FIG. 13, the imaging device includes an optical lens assembly (its reference numeral is omitted) and an image sensor 760. The optical lens assembly includes, in order from an object side to an image side, an aperture stop 700, a first lens element 710, a second lens element 720, a third lens element 730, an IR-filter 740, and an image surface 750, wherein the image sensor 760 is located at the image surface 750. The optical lens assembly has a total of three lens elements (710-730) with refractive power, and the first lens element 710, the second lens element 720, and the third lens element 710-730 are independent and non-cemented lens elements.

The first lens element 710 with positive refractive power has an object-side surface 711 being convex and an image-side surface 712 being convex. The first lens element 710 is made of plastic material and has the object-side surface 711 and the image-side surface 712 being both aspheric. The object-side surface 711 of the first lens element 710 has the largest curvature of all surfaces of lens elements in the optical lens assembly.

The second lens element 720 with negative refractive power has an object-side surface 721 being concave and an image-side surface 722 being concave. The second lens element 720 is made of plastic material and has the object-side surface 721 and the image-side surface 722 being both aspheric. A curvature of the image-side surface 722 of the second lens element 720 is increasingly concave from a paraxial region to an off-axis region thereof, and the image surface 712 of the first lens element 710 and the object-side surface 721 of the second lens element 720 have the smallest curvature of all surfaces of lens elements in the optical lens assembly.

The third lens element 730 with negative refractive power and has an object-side surface 731 being concave and an image-side surface 732 being convex. The third lens element 730 is made of plastic material and has the object-side surface 731 and the image-side surface 732 being both aspheric. A curvature of the object-side surface 731 of the third lens element 730 is increasingly concave from a paraxial region to an off-axis region thereof.

The IR-filter 740 is made of glass material and is located between the third lens element 730 and the image surface 750, and will not affect a focal length of the optical lens assembly.

The detailed optical data of the 7th embodiment are shown in Table 13 and the aspheric surface data are shown in Table 14 below.

TABLE 13

7th Embodiment
f = 3.72 mm, Fno = 2.70, HFOV = 18.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.242 | | | | |
| 2 | Lens 1 | 1.074 | ASP | 0.460 | Plastic | 1.535 | 55.7 | 1.80 |
| 3 | | −8.134 | ASP | 0.080 | | | | |
| 4 | Lens 2 | −26.845 | ASP | 1.000 | Plastic | 1.650 | 21.5 | −2.29 |
| 5 | | 1.598 | ASP | 0.396 | | | | |
| 6 | Lens 3 | −1.731 | ASP | 1.000 | Plastic | 1.535 | 55.7 | −12.56 |
| 7 | | −2.801 | ASP | 0.200 | | | | |
| 8 | IR-filter | Plano | | 0.210 | Glass | 1.517 | 64.2 | — |
| 9 | | Plano | | 0.381 | | | | |
| 10 | Image | Plano | | — | | | | |

Note:
Reference wavelength is 587.6 nm (d-line).

TABLE 14

Aspheric Coefficients

| | Surface # | | |
|---|---|---|---|
| | 2 | 3 | 4 |
| k= | −8.5313E−01 | 9.0000E+01 | 6.8053E+01 |
| A4= | 5.4283E−02 | 3.4274E−03 | −5.7314E−02 |
| A6= | 2.2277E−01 | 4.7082E−02 | 2.6602E−02 |
| A8= | −9.2927E−01 | −6.4559E−01 | −3.3582E−01 |
| A10= | 1.8545E+00 | 2.3698E+00 | 1.8343E+00 |
| A12= | −1.3577E+00 | −2.3609E+00 | −2.1992E+00 |

| | Surface # | | |
|---|---|---|---|
| | 5 | 6 | 7 |
| k= | −9.0000E+01 | 1.9949E+00 | 2.7724E+00 |
| A4= | 2.2856E+00 | −3.8531E−01 | −1.5014E−01 |
| A6= | −2.0815E+01 | −1.8537E+00 | −2.1834E−01 |
| A8= | 1.4298E+02 | 6.0810E+00 | 5.9345E−01 |
| A10= | −5.8251E+02 | −2.2524E+00 | −8.1872E−01 |

TABLE 14-continued

Aspheric Coefficients

| A12= | 1.2667E+03 | −9.5794E+01 | 5.4634E−01 |
|---|---|---|---|
| A14= | −1.0836E+03 | 2.0605E+02 | −1.4227E−01 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.72 | R5/f | −0.47 |
| Fno | 2.70 | |(R2 + R3)/(R2 − R3)| | 1.87 |
| HFOV [deg.] | 18.6 | (R3 + R4)/(R3 − R4) | 0.89 |
| (V2 + V3)/V1 | 1.39 | |f/f1| + |f/f2| | 3.69 |
| CT1/CT2 | 0.46 | SD/TD | 0.92 |
| (CT2 + CT3)/CT1 | 4.35 | TD/f | 0.79 |
| T12/CT2 | 0.08 | f/ImgH | 2.87 |

-continued

| 7th Embodiment | | | |
|---|---|---|---|
| T12/T23 | 0.20 | EPD/ImgH | 1.06 |
| R1/f | 0.29 | TL/ImgH | 2.88 |
| f/R4 | 2.33 | | |

8th Embodiment

Figure 15:
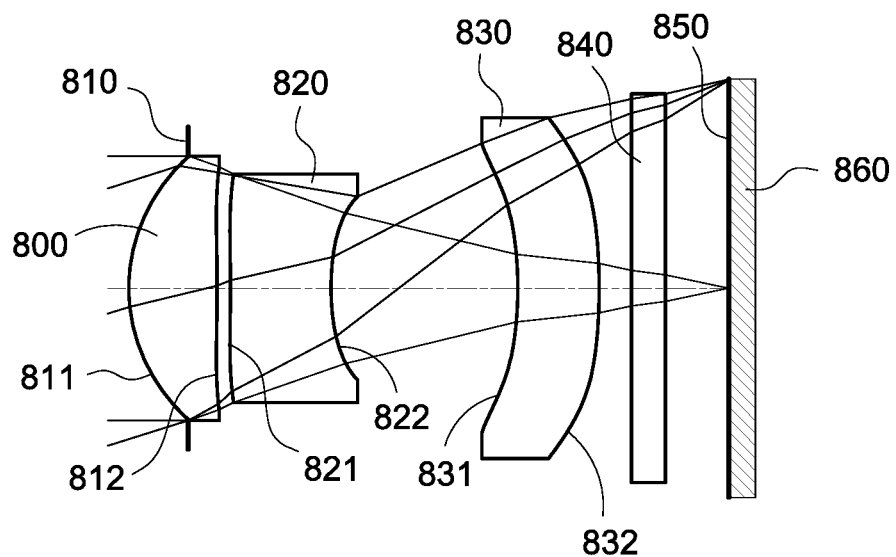
FIG. 15 is a schematic view of an image capturing device according to the 8th embodiment of the present disclosure.
Figure 16:
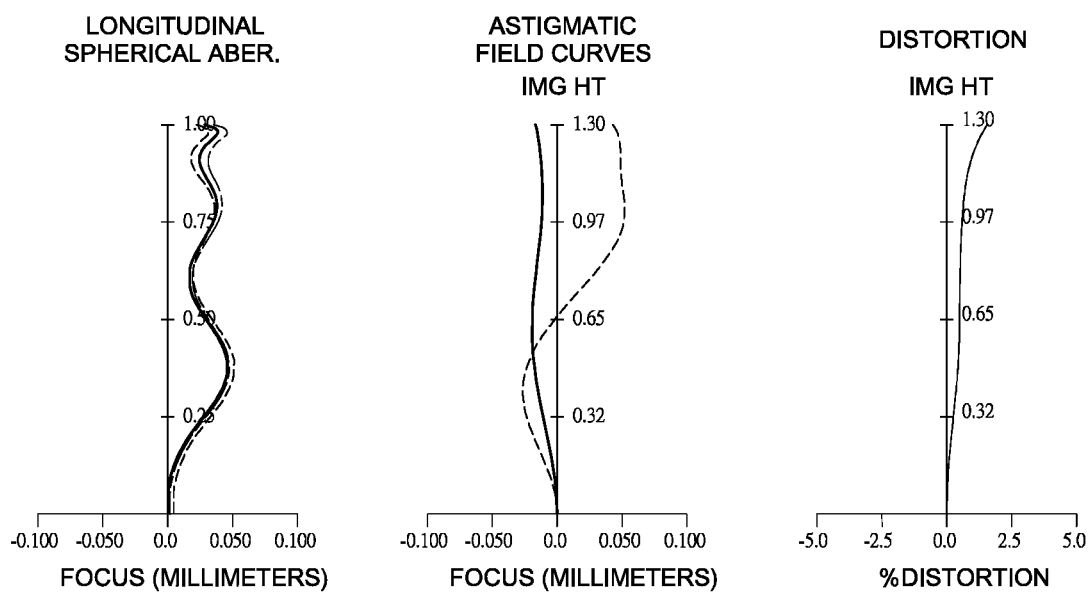
FIG. 16 shows spherical aberration curves, astigmatic field curves, and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves, and a distortion curve of the image capturing device according to the 8th embodiment. In FIG. 15, the image capturing device includes an optical lens assembly (its reference numeral is omitted) and an image sensor 860. The optical lens assembly includes, in order from an object side to an image side, an aperture atop 800, a first lens element 810, a second lens element 820, a third lens element 830, an IR-filter 840, and an image surface 850, wherein the image sensor 860 is located at the image surface 850. The optical lens assembly has a total of three lens elements (810-830) with refractive power, and the first lens element 810, the second lens element 820, and the third lens element 830 are independent and non-cemented lens elements.

The first lens element 810 with positive refractive power has an object-side surface 811 being convex and an image-side surface 812 being convex. The first lens element 810 is made of plastic material and has the object-side surface 811 and the image-side surface 812 being both aspheric. The object-side surface 811 of the first lens element 810 has the largest curvature of all surfaces of lens elements in the optical lens assembly.

The second lens element 820 with negative refractive power has an object-side surface 821 being concave and an image-side surface 822 being concave. The second lens element 820 is made of plastic material and has the object-side surface 821 and the image-side surface 822 being both aspheric. A curvature of the image-side surface 822 of the second lens element 820 is increasingly concave from a paraxial region to an off-axis region thereof, and the image-side surface 812 of the first lens element 810 and the object-side surface 821 of the second lens element 820 have the smallest curvature of all surfaces of lens elements in the optical lens assembly.

The third lens element 830 with negative refractive power has an object-side surface 831 being concave and an image-side surface 832 being convex. The third lens element 830 is made of plastic material and has the object-side surface 831 and the image-side surface 832 being both aspheric. A curvature of the object-side surface 831 of the third lens element 830 is increasingly concave from a paraxial region to an off-axis region thereof.

The IR-filter 840 is made of glass material and located between the third lens element 830 and the image surface 850, and will not affect a focal length of the optical lens assembly.

The detailed optical data of the 8th embodiment are shown in Table 15 and the aspheric surface data are shown in Table 16 below.

TABLE 16

Aspheric Coefficients

| Surface # | | | |
|---|---|---|---|
| | 2 | 3 | 4 |
| k= | −9.8183E−01 | 4.1673E+01 | 3.1824E+01 |
| A4= | 3.9497E−02 | 9.6055E−02 | 1.6607E−01 |
| A6= | 3.3371E−01 | 5.1733E−02 | 1.2189E−01 |
| A8= | −1.0291E+00 | −1.4696E−01 | −3.8760E−01 |
| A10= | 1.6446E+00 | 7.7619E−01 | 9.2530E−01 |
| A12= | −8.8510E−01 | −9.5869E−01 | −1.1126E+00 |

| Surface # | | | |
|---|---|---|---|
| | 5 | 6 | 7 |
| k= | −8.9880E+01 | 6.3861E−01 | −5.7821E+00 |
| A4= | 2.6107E+00 | 5.7408E−02 | 4.4694E−03 |
| A6= | −2.1137E+01 | −1.3229E+00 | −7.1468E−01 |
| A8= | 1.4730E+02 | 4.1269E+00 | 1.4575E+00 |
| A10= | −5.9323E+02 | −7.1585E+00 | −1.6358E+00 |
| A12= | 1.2666E+03 | 6.9024E+00 | 9.5921E−01 |
| A14= | −1.0836E+03 | −2.6428E+00 | −2.1527E−01 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.99 | R5/f | −0.59 |
| Fno | 2.43 | |(R2 + R3)/(R2 − R3)| | 15.00 |
| HFOV [deg.] | 17.6 | (R3 + R4)/(R3 − R4) | 0.72 |
| (V2 + V3)/V1 | 0.84 | |f/f1| + |f/f2| | 4.08 |
| CT1/CT2 | 0.88 | SD/TD | 0.87 |
| (CT2 + CT3)/CT1 | 2.06 | TD/f | 0.73 |

TABLE 15

8th Embodiment
f = 3.99 mm, Fno = 2.43, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.370 | | | | |
| 2 | Lens 1 | 1.046 | ASP | 0.549 | Plastic | 1.544 | 55.9 | 1.79 |
| 3 | | −11.416 | ASP | 0.083 | | | | |
| 4 | Lens 2 | −9.989 | ASP | 0.623 | Plastic | 1.639 | 23.5 | −2.16 |
| 5 | | 1.640 | ASP | 1.159 | | | | |
| 6 | Lens 3 | −2.348 | ASP | 0.505 | Plastic | 1.639 | 23.5 | −12.60 |
| 7 | | −3.593 | ASP | 0.200 | | | | |
| 8 | IR-filter | Plano | | 0.210 | Glass | 1.517 | 64.2 | — |
| 9 | | Plano | | 0.393 | | | | |
| 10 | Image | Plano | | — | | | | |

Note:
Reference wavelength is 587.6 nm (d-line).
Effective radius of Surface 5 is 0.570 mm.

-continued

| 8th Embodiment | | | |
|---|---|---|---|
| T12/CT2 | 0.13 | f/ImgH | 3.08 |
| T12/T23 | 0.07 | EPD/ImgH | 1.27 |
| R1/f | 0.26 | TL/ImgH | 2.87 |
| f/R4 | 2.43 | | |

9th Embodiment

Figure 17:
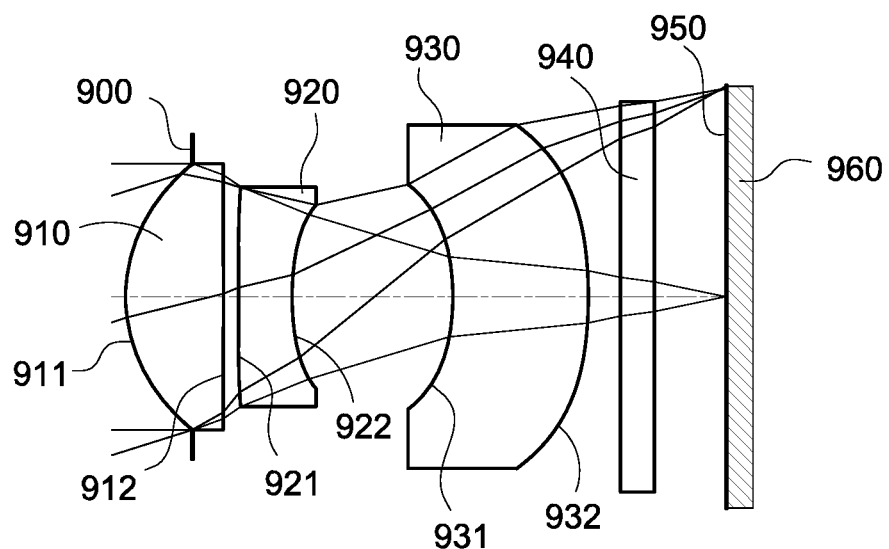
FIG. 17 is a schematic view of an image capturing device according to the 9th embodiment of the present disclosure.
Figure 18:
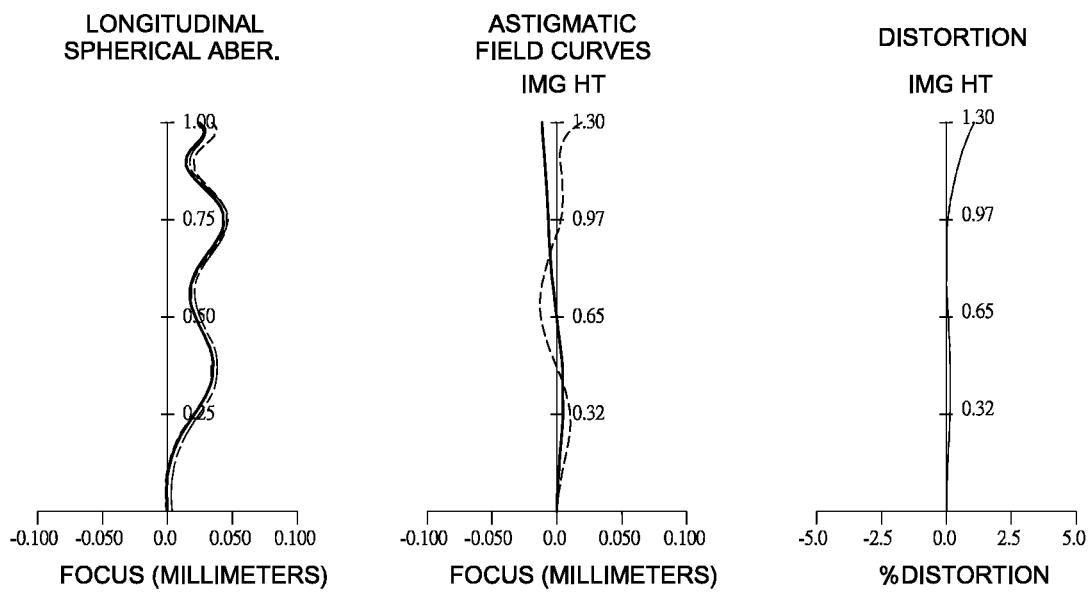
FIG. 18 shows spherical aberration curves, astigmatic field curves, and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves, and a distortion curve of the image capturing device according to the 9th embodiment. In FIG. 17, the image capturing device includes an optical lens assembly (its reference numeral is omitted) and an image sensor 960. The optical lens assembly includes, in order from an object side to an image side, an aperture stop 900, a first lens element 910, a second lens element 920, a third lens element 930, an IR-filter 940, and an image surface 950, wherein the image sensor 960 is located at the image surface 950 of the optical lens assembly. The optical lens assembly has a total of three lens elements (910-930), and the first lens element 910, the second lens element 920, and the third lens element 930 are independent and non-cemented lens elements.

The first lens element 910 with positive refractive power has an object-side surface 911 being convex and an image-surface 912 being convex. The first lens element 910 is made of plastic and has the object-side surface 911 and the image-side surface 912 being both aspheric. The object-side surface 911 of the first lens element 910 has the largest curvature of all surfaces of lens elements in the optical lens assembly.

The second lens element 920 with negative refractive power has an object-side surface 921 being concave and an image-side surface 922 being concave. The second lens element 920 is made of plastic material and has the object-side surface 921 and the image-side surface 922 being both aspheric. A curvature of the image-side surface 922 of the second lens element 920 is increasingly concave from a paraxial region to an off-axis region thereof, and the image-side surface 912 of the first lens element 910 and the object-side surface 921 of the second lens element 920 have the smallest curvature of all surfaces of lens elements in the optical lens assembly.

The third lens element 930 with negative refractive power has an object-side surface 931 being concave and an image-side surface 932 being convex. The third lens element 930 is made of plastic and has the object-side surface 931 and the image-surface 932 being both aspheric. A curvature of the object-side surface 931 of the third lens element 930 is increasingly concave from a paraxial region to an off-axis region thereof.

The IR-filter 940 is made of glass material and located between the third lens element 930 and the image surface 950, and will not affect a focal length of the optical lens assembly.

The detailed optical data of the 9th embodiment are shown in Table 17 and the aspheric surface data are shown in Table 18 below.

TABLE 17

9th Embodiment
f = 4.01 mm, Fno = 2.43, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.413 | | | | |
| 2 | Lens 1 | 0.991 | ASP | 0.607 | Plastic | 1.544 | 55.9 | 1.75 |
| 3 | | −18.211 | ASP | 0.093 | | | | |
| 4 | Lens 2 | −25.135 | ASP | 0.332 | Plastic | 1.639 | 23.5 | −2.53 |
| 5 | | 1.736 | ASP | 0.996 | | | | |
| 6 | Lens 3 | −1.561 | ASP | 0.840 | Plastic | 1.639 | 23.5 | −7.57 |
| 7 | | −2.788 | ASP | 0.200 | | | | |
| 8 | IR-filter | Plano | | 0.210 | Glass | 1.517 | 64.2 | — |
| 9 | | Plano | | 0.447 | | | | |
| 10 | Image | Plano | | — | | | | |

Note:
Reference wavelength is 587.6 nm (d-line).
Effective radius of Surface 5 is 0.570 mm.

TABLE 18

Aspheric Coefficients

| Surface # | | | |
|---|---|---|---|
| | 2 | 3 | 4 |
| k= | −8.7841E−01 | −6.0246E+01 | 1.6867E+01 |
| A4= | 5.4633E−02 | 1.4282E−01 | 2.0406E−01 |
| A6= | 3.9878E−01 | −6.7128E−01 | −7.7997E−01 |
| A8= | −1.2901E+00 | 2.1830E+00 | 3.1152E+00 |
| A10= | 2.2213E+00 | −3.3154E+00 | −6.0933E+00 |
| A12= | −1.3550E+00 | 1.7341E+00 | 4.3801E+00 |

| Surface # | | | |
|---|---|---|---|
| | 5 | 6 | 7 |
| k= | −8.9899E+01 | 1.7555E+00 | −6.2658E+00 |
| A4= | 2.1413E+00 | −4.7461E−01 | −2.5285E−01 |
| A6= | −1.5365E+01 | 2.5681E+00 | 2.5871E−01 |
| A8= | 9.6148E+01 | −1.6837E+01 | −6.1344E−01 |
| A10= | −3.4796E+02 | 5.5943E+01 | 8.2196E−01 |
| A12= | 6.6267E+02 | −9.6482E+01 | −5.8296E−01 |
| A14= | −4.8431E+02 | 6.5636E+01 | 1.6299E−01 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.01 | R5/f | −0.39 |
| Fno | 2.43 | |(R2 + R3)/(R2 − R3)| | 6.26 |
| HFOV [deg.] | 17.6 | (R3 + R4)/(R3 − R4) | 0.87 |
| (V2 + V3)/V1 | 0.84 | |f/f1| + |f/f2| | 3.89 |
| CT1/CT2 | 1.83 | SD/TD | 0.86 |
| (CT2 + CT3)/CT1 | 1.93 | TD/f | 0.71 |
| T12/CT2 | 0.28 | f/ImgH | 3.10 |
| T12/T23 | 0.09 | EPD/ImgH | 1.28 |
| R1/f | 0.25 | TL/ImgH | 2.88 |
| f/R4 | 2.31 | | |

10th Embodiment

Figure 19:
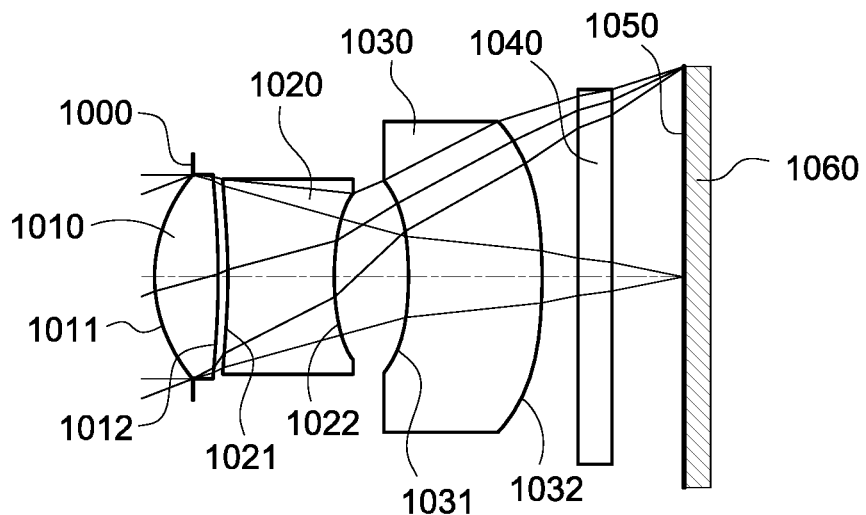
FIG. 19 is a schematic view of an image capturing device according to the 10th embodiment of the present disclosure.
Figure 20:
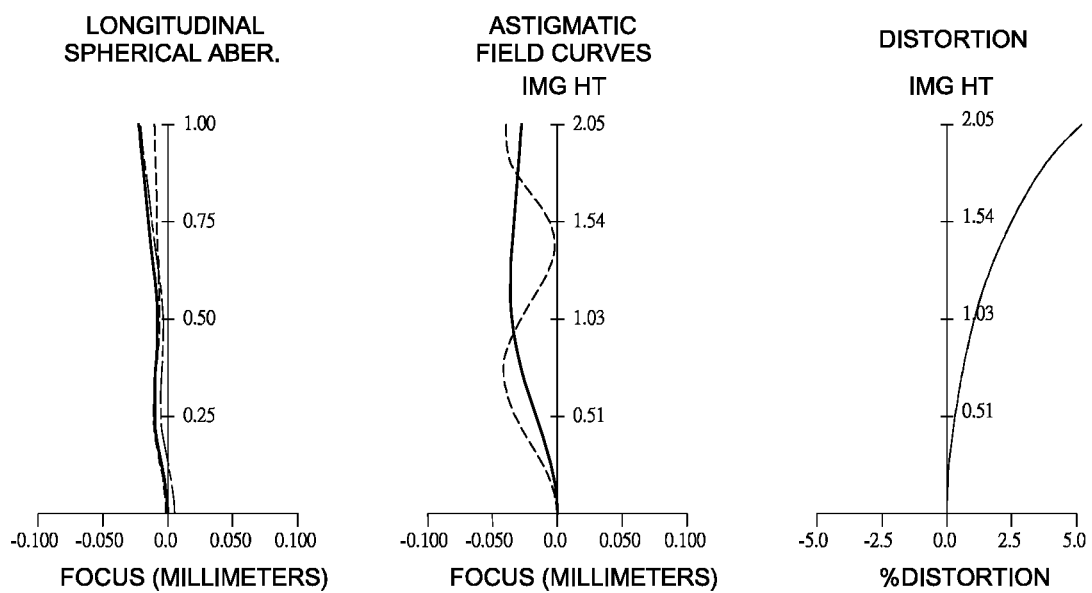
FIG. 20 shows spherical aberration curves, astigmatic field curves, and a distortion curve of the image capturing device according to the 10th embodiment.

FIG. 19 is a schematic view of an image capturing device according to the 10th embodiment of the present disclosure. FIG. 20 shows, in order from left to right, spherical aberration curves, astigmatic field curves, and a distortion curve of the image capturing device according to the 10th embodiment. In FIG. 19, the image capturing device includes an optical lens assembly (its reference numeral is omitted) and an image sensor 1060. The optical lens assembly includes, in order from an object side to an image side, an aperture stop 1000, a first lens element 1010, a second lens element 1020, a third lens element 1030, an IR-filter 1040, and an image surface 1050, wherein the image sensor 1060 is located at the image surface 1050. The optical lens assembly has a total of three lens elements (1010-1030) with refractive power, and the first lens element 1010, the second lens element 1020, and the third lens element 1030 are independent and non-cemented lens elements.

The first lens element 1010 with positive refractive power has an object-side surface 1011 being convex and an image-side surface 1012 being convex. The first lens element 1010 is made of glass material and has the object-side surface 1011 and the image-side surface 1012 being both aspheric. The object-side surface 1011 of the first lens element 1010 has the largest curvature of all surfaces of lens elements in the optical lens assembly.

The second lens element 1020 with negative refractive power has an object-side surface 1021 being concave and an image-side surface 1022 being concave. The second lens element 1020 is made of plastic material and has the object-side surface 1021 and the image-side surface 1022 being both aspheric. A curvature of the image-side surface 1022 of the second lens element 1020 is increasingly concave from a paraxial region to an off-axis region thereof, and the image-side surface 1012 of the first lens element 1010 and the object-side surface 1021 of the second lens element 1020 have the smallest curvature of all surfaces of lens elements in the optical lens assembly.

The third lens element 1030 with negative refractive power has an object-side surface 1031 being concave and an image-side surface 1032 being convex. The third surface 1030 is made of plastic material and has the object-side surface 1031 and the image-side surface 1032 being both aspheric. A curvature of the object-side surface 1031 of the third lens element 1030 is increasingly concave from a paraxial region to an off-axis region thereof.

The IR-filter 1040 is made of glass material and located between the third lens element 1030 and the image surface 1050, and will not affect a focal length of the optical lens assembly.

The detailed optical data of the 10th embodiment are shown in Table 19 and the aspheric surface data are shown in Table 20 below.

TABLE 19

10th Embodiment
f = 5.07 mm, Fno = 2.55, HFOV = 21.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.372 | | | | |
| 2 | Lens 1 | 1.487 | ASP | 0.619 | Glass | 1.571 | 52.9 | 2.29 |
| 3 | | −9.181 | ASP | 0.094 | | | | |
| 4 | Lens 2 | −8.004 | ASP | 1.037 | Plastic | 1.614 | 25.6 | −3.07 |
| 5 | | 2.593 | ASP | 0.725 | | | | |
| 6 | Lens 3 | −3.544 | ASP | 1.300 | Plastic | 1.614 | 25.6 | −15.68 |
| 7 | | −6.392 | ASP | 0.350 | | | | |
| 8 | IR-filter | Plano | | 0.330 | Glass | 1.517 | 64.2 | — |
| 9 | | Plano | | 0.703 | | | | |
| 10 | Image | Plano | | — | | | | |

Note:
Reference wavelength is 587.6 nm (d-line).

TABLE 20

Aspheric Coefficients

| | Surface # | | |
|---|---|---|---|
| | 2 | 3 | 4 |
| k= | −7.3563E−01 | −1.0000E+00 | 1.7955E+01 |
| A4= | 2.0445E−02 | 1.5704E−03 | 8.6684E−04 |
| A6= | 2.4312E−02 | −2.2178E−03 | 4.8988E−03 |
| A8= | −3.5708E−02 | −4.8991E−03 | 4.2656E−03 |
| A10= | 3.1671E−02 | 1.9608E−02 | 1.3008E−02 |
| A12= | −1.0130E−02 | −9.8385E−03 | −8.7395E−03 |

| | Surface # | | |
|---|---|---|---|
| | 5 | 6 | 7 |
| k= | −9.0000E+01 | 7.2023E+00 | 5.8818E+00 |
| A4= | 5.9505E−01 | −8.7320E−02 | −3.2020E−02 |
| A6= | −2.0156E+00 | −7.9348E−02 | −2.5416E−02 |
| A8= | 5.8199E+00 | 1.5107E−01 | 3.1734E−02 |
| A10= | −9.8298E+00 | −2.0901E−01 | −2.0674E−02 |
| A12= | 9.0228E+00 | 1.9939E−02 | 6.4297E−03 |
| A14= | −3.1899E+00 | 1.0485E−01 | −7.6245E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.07 | R5/f | −0.70 |
| Fno | 2.55 | \|(R2 + R3)/(R2 − R3)\| | 14.60 |
| HFOV [deg.] | 21.1 | (R3 + R4)/(R3 − R4) | 0.51 |
| (V2 + V3)/V1 | 0.97 | \|f/f1\| + \|f/f2\| | 3.87 |
| CT1/CT2 | 0.60 | SD/TD | 0.90 |
| (CT2 + CT3)/CT1 | 3.78 | TD/f | 0.74 |
| T12/CT2 | 0.09 | f/ImgH | 2.47 |
| T12/T23 | 0.13 | EPD/ImgH | 0.97 |
| R1/f | 0.29 | TL/ImgH | 2.52 |
| f/R4 | 1.96 | | |

11th Embodiment

Figure 21:
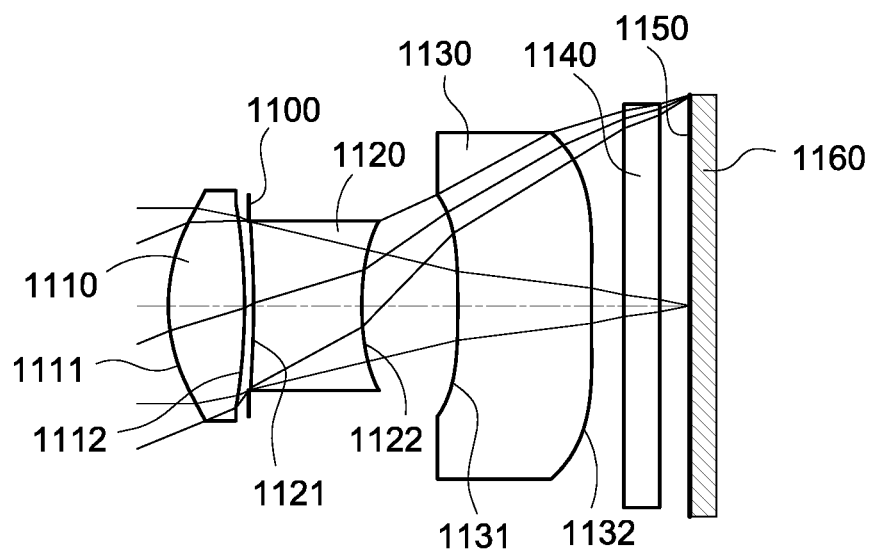
FIG. 21 is a schematic view of an image capturing device according to the 11th embodiment of the present disclosure.
Figure 22:
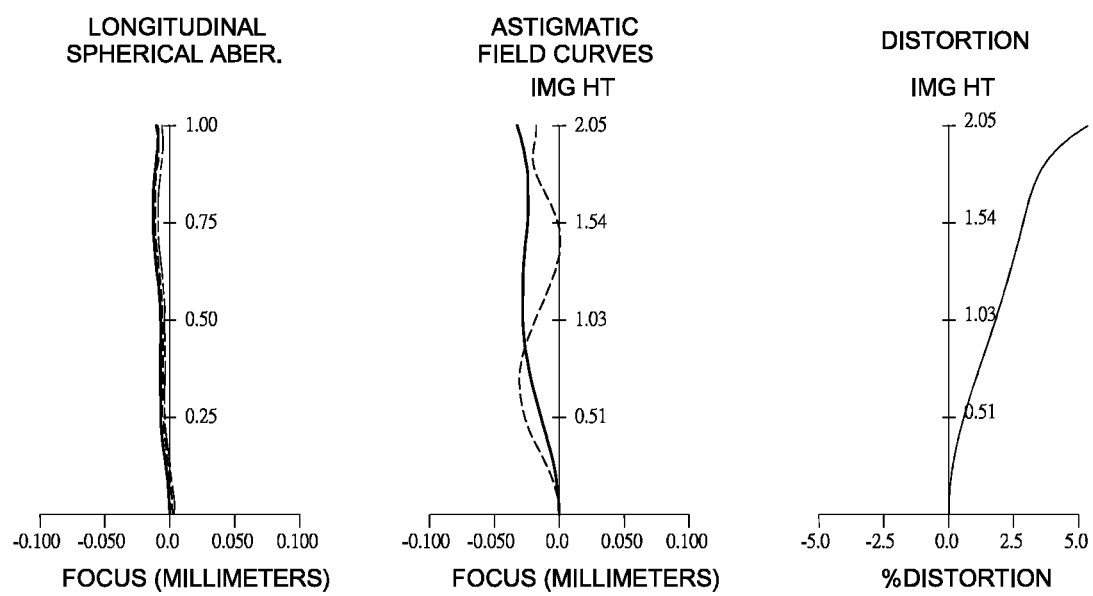
FIG. 22 shows spherical aberration curves, astigmatic field curves, and a distortion curve of the image capturing device according to the 11th embodiment.

FIG. 21 is a schematic view of an image capturing device according to the 11th embodiment of the present disclosure. FIG. 22 shows, in order from left to right, spherical aberration curves, astigmatic field curves, and a distortion curve of the image capturing device according to the 11th embodiment. In FIG. 21, the image capturing device includes an optical lens assembly (its reference numeral is omitted) and an image sensor 1160. The optical lens assembly includes, in order from an object side to an image side, a first lens element 1110, an aperture stop 1100, a second lens element 1120, a third lens element 1130, an IR-filter 1140, and an image surface 1150, wherein the image sensor 1160 is located at the image surface 1150. The optical lens assembly has a total of three lens elements (1110-1130), and the first lens element 1110, the second lens element 1120, and the third lens element 1130 are independent and non-cemented lens elements.

The first lens element 1110 with positive refractive power has an object-side surface 1111 being convex and an image-side surface 1112 being convex. The first lens element 1110 is made of plastic material and has the object-side surface 1111 and the image-side surface 1112 being both aspheric. The object-side surface 1111 of the first lens element 1110 has the largest curvature of all surfaces of lens elements in the optical lens assembly.

The second lens element 1120 with negative refractive power has an object-side surface 1121 being concave and an image-side surface 1122 being concave. The second lens element 1120 is made of plastic material and has the object-side surface 1121 and the image-side surface 1122 being both aspheric. A curvature of the image-side surface 1122 of the second lens element 1120 is increasingly concave from a paraxial region to an off-axis region thereof, and the image-side surface 1112 of the first lens element 1110 and the object-side surface 1121 of the second lens element 1120 have the smallest curvature of all surfaces of lens elements in the optical lens assembly.

The third lens element 1130 with negative refractive power has an object-side surface 1131 being concave and an image-side surface 1132 being concave. The third lens element 1130 is made of plastic and has the object-side surface 1131 and the image-side surface 1132 being both aspheric. A curvature of the object-side surface 1131 of the third lens element 1130 is increasingly concave from a paraxial region to an off-axis region thereof.

The IR-filter 1140 is made of glass material and located between the third lens element 1130 and the image surface 1150, and will not affect a focal length of the optical lens assembly.

The detailed optical data of the 11th embodiment are shown in Table 21 and the aspheric surface data are shown in Table 22 below.

TABLE 21

11th Embodiment
f = 4.77 mm, Fno = 2.50, HFOV = 22.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.718 | ASP | 0.745 | Plastic | 1.583 | 55.0 | 2.35 |
| 2 | | −5.727 | ASP | 0.040 | | | | |
| 3 | Ape. Stop | Plano | | 0.049 | | | | |
| 4 | Lens 2 | −8.074 | ASP | 1.051 | Plastic | 1.614 | 25.6 | −3.12 |
| 5 | | 2.640 | ASP | 0.939 | | | | |
| 6 | Lens 3 | −12.018 | ASP | 1.300 | Plastic | 1.640 | 23.3 | −13.00 |
| 7 | | 28.152 | ASP | 0.316 | | | | |
| 8 | IR-filter | Plano | | 0.350 | Glass | 1.517 | 64.2 | — |
| 9 | | Plano | | 0.294 | | | | |
| 10 | Image | Plano | | — | | | | |

Note:
Reference wavelength is 587.6 nm (d-line).

TABLE 22

Aspheric Coefficients

| | Surface # | | |
|---|---|---|---|
| | 1 | 2 | 4 |
| k= | −9.9182E−01 | −1.0000E+00 | −3.5109E+01 |
| A4= | 1.1161E−02 | 1.6958E−02 | 1.8094E−02 |
| A6= | 1.4481E−02 | 3.4567E−03 | 1.6889E−02 |
| A8= | −3.5796E−02 | −2.9480E−02 | −2.1314E−02 |
| A10= | 3.1107E−02 | 1.6853E−02 | −9.1958E−04 |
| A12= | −1.5102E−02 | −5.1448E−03 | 1.3445E−02 |

| | Surface # | | |
|---|---|---|---|
| | 5 | 6 | 7 |
| k= | −8.7354E+01 | −5.5959E+01 | −9.0000E+01 |
| A4= | 5.5850E−01 | −6.9340E−02 | −2.8689E−02 |
| A6= | −1.8980E+00 | −8.7244E−02 | −3.1955E−02 |

TABLE 22-continued

| Aspheric Coefficients | | | |
|---|---|---|---|
| A8= | 5.5586E+00 | 1.3929E−01 | 2.4110E−02 |
| A10= | −9.8481E+00 | −1.3841E−01 | −1.0521E−02 |
| A12= | 9.4766E+00 | 4.0025E−02 | 2.1689E−03 |
| A14= | −3.6977E+00 | 5.9606E−03 | −1.5780E−04 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 2a s the following values and satisfy the following conditions:

| 11th Embodiment | | | |
|---|---|---|---|
| f [mm] | 4.77 | R5/f | −2.52 |
| Fno | 2.50 | \|(R2 + R3)/(R2 − R3)\| | 5.88 |
| HFOV [deg.] | 22.2 | (R3 + R4)/(R3 − R4) | 0.51 |
| (V2 + V3)/V1 | 0.89 | \|f/f1\| + \|f/f2\| | 3.55 |
| CT1/CT2 | 0.71 | SD/TD | 0.81 |
| (CT2 + CT3)/CT1 | 3.16 | TD/f | 0.87 |
| T12/CT2 | 0.09 | f/ImgH | 2.32 |
| T12/T23 | 0.09 | EPD/ImgH | 0.93 |
| R1/f | 0.36 | TL/ImgH | 2.48 |
| f/R4 | 1.81 | | |

12th Embodiment

Figure 23:
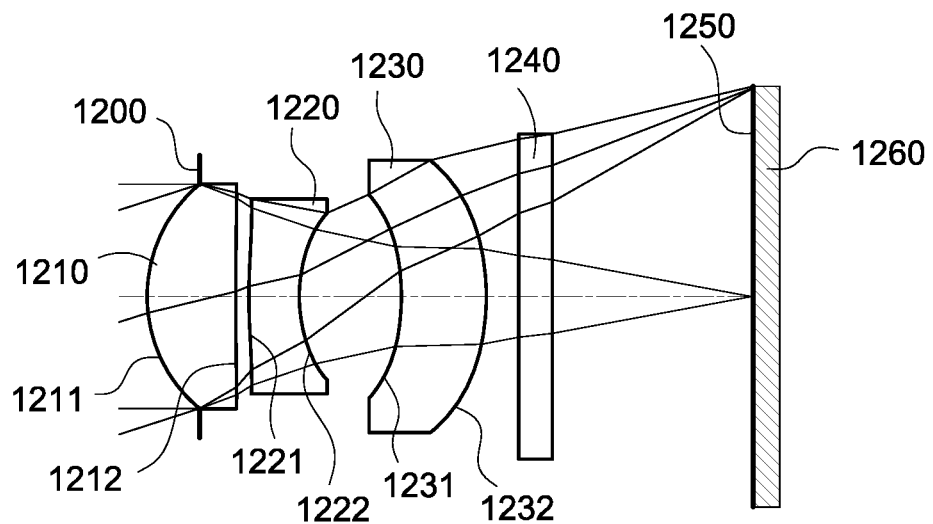
FIG. 23 is a schematic view of an image capturing device according to the 12th embodiment of the present disclosure.
Figure 24:
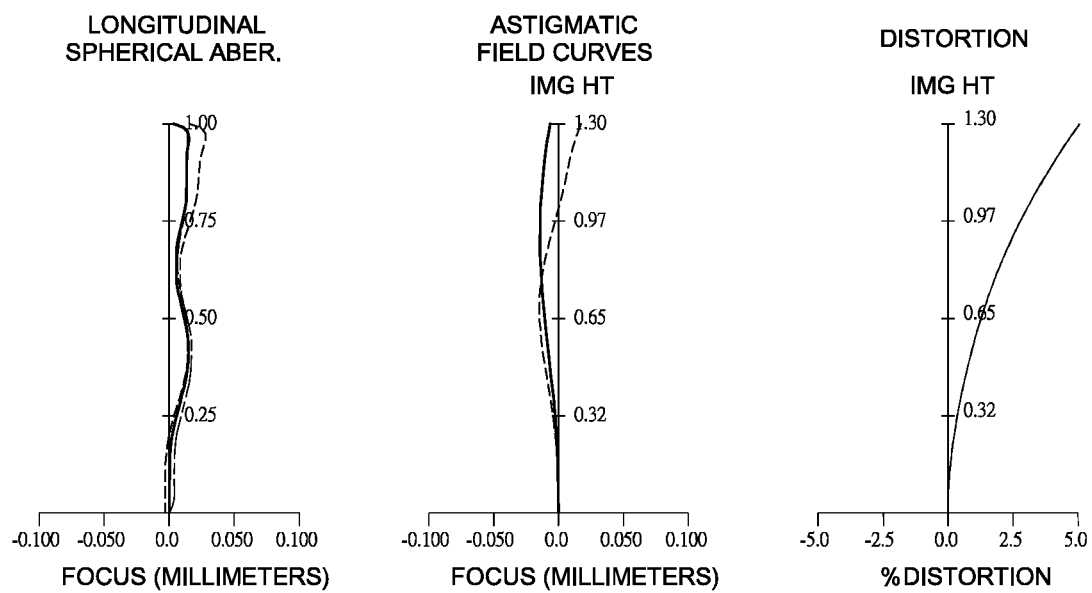
FIG. 24 shows spherical aberration curves, astigmatic field curves, and a distortion curve of the image capturing device according to the 12th embodiment.

FIG. 23 is a schematic view of an image capturing device according to the 12th embodiment of the present disclosure. FIG. 24 shows, in order from left to right, spherical aberration curves, astigmatic field curves, and a distortion curve of the image capturing device according to the 12th embodiment. In FIG. 23, the image capturing device includes an optical lens assembly (its reference numeral is omitted) and an image sensor 1260. The optical lens assembly includes, in order from an object side to an image side, an aperture stop 1200, a first lens element 1210, a second lens element 1220, a third lens element 1230, an IR-filter 1240, and an image surface 1250, wherein the image sensor 1260 is located at the image surface 1250 of the optical lens assembly. The optical lens assembly has a total of three lens elements (1210-1230), and the first lens element 1210, the second lens element 1220, and the third lens element 1230 are independent and non-cemented lens element.

The first lens element 1210 with positive refractive power has an object-side surface 1211 being convex and an image-side surface 1212 being concave. The first lens element 1210 is made of plastic and has the object-side surface 1211 and the image-side surface 1212 being both aspheric. The object-side surface 1211 of the first lens element 1210 has the largest curvature of all surfaces of lens elements in the optical lens assembly.

The second lens element 1220 with negative refractive power has an object-side surface 1221 being convex and an image-side surface 1222 being concave. The second lens element 1220 is made of plastic and has the object-side surface 1221 and the image-side surface 1222 being both aspheric. A curvature of the image-side surface 1222 of the second lens element 1220 is increasingly concave from a paraxial region to an off-axis region thereof, and the image-side surface 1212 of the first lens element 1210 and the object-side surface 1221 of the second lens element 1220 have the smallest curvature of all surfaces of lens elements in the optical lens assembly.

The third lens element 1230 with positive refractive power has an object-side surface 1231 being concave and an image-side surface 1232 being convex. The third lens element 1230 is made of plastic and has the object-side surface 1231 and the image-side surface 1232 being both aspheric. A curvature of the object-side surface 1231 of the third lens element 1230 is increasingly concave from a paraxial region to an off-axis region thereof.

The IR-filter 1240 is made of glass material and is located between the third lens element 1230 and the image surface 1250, and will not affect a focal length of the optical lens assembly.

The detailed optical data of the 12th embodiment are shown in Table 23 and the aspheric surface data are shown in Table 24 below.

TABLE 23

12th Embodiment
f = 3.83 mm, Fno = 2.75, HFOV = 17.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.325 | | | | |
| 2 | Lens 1 | 0.916 | ASP | 0.551 | Plastic | 1.530 | 55.8 | 1.77 |
| 3 | | 28.331 | ASP | 0.080 | | | | |
| 4 | Lens 2 | 3.640 | ASP | 0.313 | Plastic | 1.640 | 23.3 | −2.07 |
| 5 | | 0.938 | ASP | 0.633 | | | | |
| 6 | Lens 3 | −1.494 | ASP | 0.527 | Plastic | 1.640 | 23.3 | 20.22 |
| 7 | | −1.524 | ASP | 0.200 | | | | |
| 8 | IR-filter | Plano | | 0.210 | Glass | 1.517 | 64.2 | — |
| 9 | | Plano | | 1.244 | | | | |
| 10 | Image | Plano | | — | | | | |

Note:
Reference wavelength is 587.6 nm (d-line).

TABLE 24

| Aspheric Coefficients | | |
|---|---|---|
| Surface # | | |
| 2 | 3 | 4 |
| k= −6.6938E−01 | 9.0000E+01 | −6.9099E+01 |
| A4= 9.4013E−02 | −4.1050E−02 | −1.3234E−01 |
| A6= 3.2108E−01 | 2.5273E−02 | −1.4519E−01 |
| A8= −8.8168E−01 | 4.9037E−02 | 4.4150E−01 |

TABLE 24-continued

| Aspheric Coefficients | | | |
|---|---|---|---|
| A10= | 1.9267E+00 | 1.5435E+00 | 1.8095E+00 |
| A12= | −9.7768E−01 | −3.5313E+00 | −6.8589E+00 |

| | Surface # | | |
|---|---|---|---|
| | 5 | 6 | 7 |
| k= | −2.0744E+01 | 2.3276E+00 | −7.7810E−02 |
| A4= | 2.8377E+00 | −1.6915E−01 | −8.5640E−02 |
| A6= | −2.1851E+01 | −6.2761E−01 | −2.6569E−01 |
| A8= | 1.4515E+02 | 3.0321E+00 | 7.3860E−01 |
| A10= | −5.7798E+02 | −9.2903E+00 | −1.4850E+00 |
| A12= | 1.2667E+03 | 5.9049E+00 | 1.2989E+00 |
| A14= | −1.0836E+03 | 1.4239E+01 | −4.4284E−01 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 3.83 | R5/f | −0.39 |
| Fno | 2.75 | |(R2 + R3)/(R2 − R3)| | 1.29 |
| HFOV [deg.] | 17.8 | (R3 + R4)/(R3 − R4) | 1.69 |
| (V2 + V3)/V1 | 0.84 | |f/f1| + |f/f2| | 4.01 |
| CT1/CT2 | 1.76 | SD/TD | 0.85 |
| (CT2 + CT3)/CT1 | 1.53 | TD/f | 0.55 |
| T12/CT2 | 0.03 | f/ImgH | 2.96 |
| T12/T23 | 0.13 | EPD/ImgH | 1.08 |
| R1/f | 0.24 | TL/ImgH | 2.90 |
| f/R4 | 4.08 | | |

13th Embodiment

Figure 25:
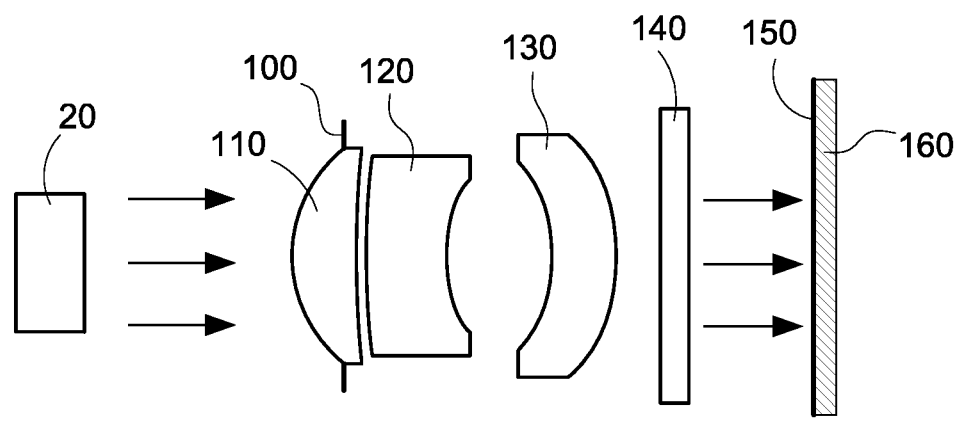
FIG. 25 is a schematic view of an image capturing device according to the 13th embodiment of the present disclosure.

FIG. 25 is a schematic view of an image capturing device according to the 13th embodiment of the present disclosure. In FIG. 25, the image capturing device includes the optical lens assembly (its reference numeral is omitted) according to the present disclosure and the image sensor. It should be noted that the optical lens assembly and the image sensor 160 shown in the FIG. 25 are the same as aforementioned in the 1st embodiment, and the same reference numbers are used in the drawing and the description to refer to the same parts. In practical applications, the optical lens assembly and the image sensor can be one of the optical lens assemblies and image sensors aforementioned in the 2nd to 12th embodiment.

The optical lens assembly is located between an imaged object 20 and the image sensor 160, and the image sensor 160 is located at the image surface 150 of the optical lens assembly. The optical lens assembly is configured to image the imaged object 20 on the image sensor 160 located at the image surface 150.

14th Embodiment

Figure 26:
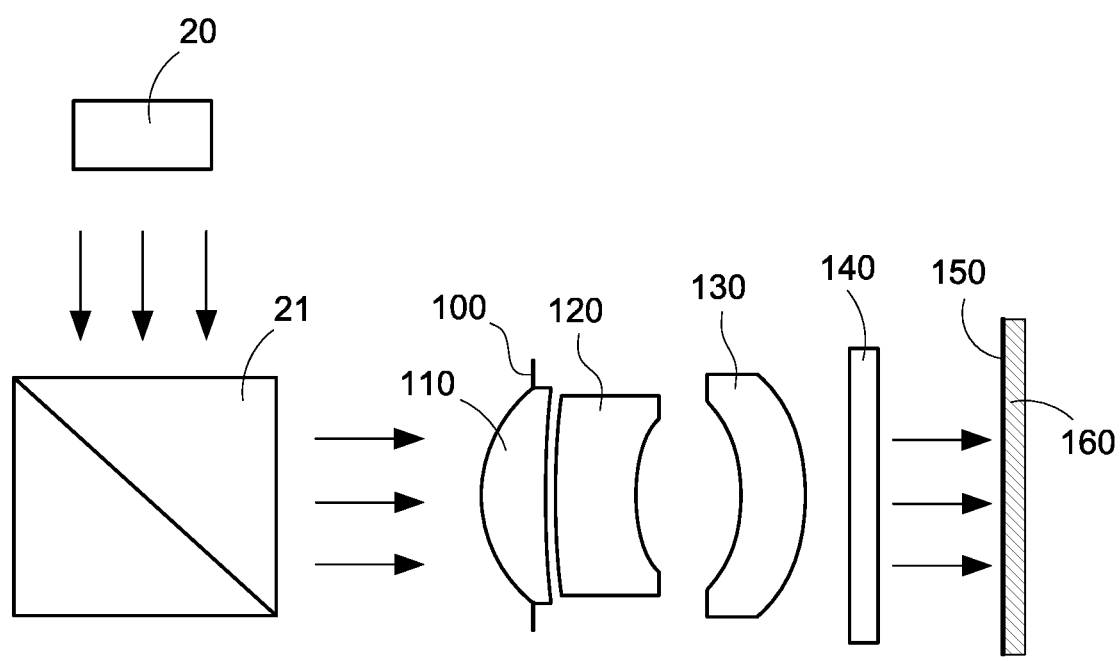
FIG. 26 is a schematic view of an image capturing device according to the 14th embodiment of the present disclosure.

FIG. 26 is a schematic view of an image capturing device according to the 14th embodiment of the present disclosure. In FIG. 26, the image capturing device includes the optical lens assembly (its reference numeral is omitted) according to the present disclosure, a prism 21, and the image sensor. It should be noted that the optical lens assembly and the image sensor shown in the FIG. 26 are the same as aforementioned in the 1st embodiment, and the same reference numbers are used in the drawing and the description to refer to the same parts. In practical applications, the optical lens assembly and the image sensor can be one of the optical lens assemblies and image sensors aforementioned in the 2nd to 12th embodiment.

The optical lens assembly is located between an imaged object 20 and the image sensor 160, the image sensor 160 is located at the image surface 150 of the optical lens assembly, and the prism 21 is located between the image object 20 and the optical lens assembly. The optical lens assembly is configured to image the imaged object 20 on the image sensor 160 located at the image surface 150. The prism 21 has a function of redirecting light at a designed angle, so that the imaged capturing device has a flexible space allocation since the height of the image capturing device is reduced, and the image capturing device can be employed in compact electronic devices.

The foregoing description, for purpose of explanation, has been described with reference to specific embodiments. It is to be noted that Tables 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has positive refractive power, the object-side surface of the first lens element is convex in a paraxial region thereof and at least one of the object-side and image-side surfaces of the first lens element is aspheric; the second lens element has negative refractive power, the object-side surface of the second lens element is convex in a paraxial region thereof, and the image-side surface of the second lens element is concave in a paraxial region thereof; the image-side surface of the third lens element is convex in a paraxial region thereof;

wherein the optical lens assembly has a total of three lens elements, a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, a curvature radius of the object-side surface of the second lens element is R3, a focal length of the optical lens assembly is f, and the following conditions are satisfied:

$0 < CT1/CT2 < 1.65$;

$0.25 \leq R1/f < 0.40$;

$0.5 < |(R2+R3)/(R2-R3)| < 20$; and $1.30 < (CT2+CT3)/CT1 \leq 2.25$.

2. The optical lens assembly of claim 1, wherein the object-side surfaces and the image-side surfaces of the first lens element and the second lens element are aspheric, an axial distance between the first lens element and the second lens element is T12, the central thickness of the second lens element is CT2, and the following condition is satisfied:

$0 \leq T12/CT2 \leq 0.12$.

3. The optical lens assembly of claim 1, wherein the first lens element and the second lens element are made of plastic, an axial distance between the first lens element and the second lens element is T12, an axial distance between the second lens element and the third lens element is T23, and the following condition is satisfied:

$0 < T12/T23 \leq 0.09$.

4. The optical lens assembly of claim 1, wherein each of the three lens elements is a single and non-cemented lens element, the focal length of the optical lens assembly is f, a curvature radius of the image-side surface of the second lens element is R4, an axial distance between the first lens element and the second lens element is T12, an axial distance between the second lens element and the third lens element is T23, the central thickness of the first lens element is CT1, the central thickness of the second lens element is CT2, and the following conditions are satisfied:

$1.25 < f/R4$;

$0 < T12/T23 < 0.50$; and $0.80 \leq CT1/CT2 < 1.65$.

5. The optical lens assembly of claim 1, wherein a refractive index of the third lens element is a maximum value among refractive indexes of the three lens elements.

6. The optical lens assembly of claim 1, wherein an absolute value of a curvature radius of the object-side surface of the third lens element is smaller than an absolute value of a curvature radius of the image-side surface of the third lens element.

7. An image capturing device, comprising:
the optical lens assembly of claim 1;
a prism; and
an image sensor disposed on an image surface of the optical lens assembly.

8. An optical lens assembly, comprising three lens elements, the three lens elements being, in order from an object side to an image side: a first lens element, a second lens element and a third lens element; each of the three lens elements comprising an object-side surface facing toward the object side and an image-side surface facing toward the image side;
wherein the first lens element has positive refractive power, the object-side surface of the first lens element is convex in a paraxial region thereof, and the image-side surface of the first lens element is concave in a paraxial region thereof; the second lens element has negative refractive power, the object-side surface of the second lens element is convex in a paraxial region thereof, and the image-side surface of the second lens element is concave in a paraxial region thereof; the image-side surface of the third lens element is convex in a paraxial region thereof, and a refractive index of the third lens element is a maximum value among refractive indexes of the three lens elements, a central thickness of the first lens element is larger than a central thickness of the third lens element;
wherein the optical lens assembly has a total of three lens elements, a central thickness of the first lens element is CT1, a central thickness of the second lens element is CT2, a curvature radius of the object-side surface of the first lens element is R1, a curvature radius of the image-side surface of the first lens element is R2, a curvature radius of the object-side surface of the second lens element is R3, a focal length of the optical lens assembly is f, and the following conditions are satisfied:

$0 < CT1/CT2 < 1.65$;

$0 < R1/f < 0.40$; and $0.5 < |(R2+R3)/(R2-R3)| < 20$.

9. The optical lens assembly of claim 8, wherein the object-side surfaces and the image-side surfaces of the first lens element and the second lens element are aspheric, the central thickness of the first lens element is CT1, the central thickness of the second lens element is CT2, and the following condition is satisfied:

$0.80 \leq CT1/CT2 < 1.65$.

10. The optical lens assembly of claim 8, wherein the first lens element and the second lens element are made of plastic, the curvature radius of the image-side surface of the first lens element is R2, the curvature radius of the object-side surface of the second lens element is R3, and the following condition is satisfied:

$0.5 < |(R2+R3)/(R2-R3)| \leq 9.32$.

11. The optical lens assembly of claim 8, wherein the curvature radius of the object-side surface of the first lens element is R1, the focal length of the optical lens assembly is f, and the following condition is satisfied:

$0.25 \leq R1/f < 0.40$.

12. The optical lens assembly of claim 8, wherein the focal length of the optical lens assembly is f, a focal length of the first lens element is f1, a focal length of the second lens element is f2, and the following condition is satisfied:

$3.0 < |f/f1| + |f/f2| < 6.0$.

13. The optical lens assembly of claim 8, wherein an absolute value of a curvature radius of the object-side surface of the third lens element is smaller than an absolute value of a curvature radius of the image-side surface of the third lens element.

14. An image capturing device, comprising:
the optical lens assembly of claim 8;
a prism; and
an image sensor disposed on an image surface of the optical lens assembly.

15. An optical lens assembly, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has positive refractive power, the object-side surface of the first lens element is convex in a paraxial region thereof; the second lens element has negative refractive power, the object-side surface of the second lens element is convex in a paraxial region thereof, and the image-side surface of the second lens element is concave in a paraxial region thereof; the image-side surface of the third lens element is convex in a paraxial region thereof, and a central thickness of the first lens element is larger than a central thickness of the third lens element;

wherein the optical lens assembly has a total of three lens elements, a central thickness of the first lens element is CT1, a central thickness of the second lens element is CT2, a curvature radius of the object-side surface of the first lens element is R1, a focal length of the optical lens assembly is f, and the following conditions are satisfied:

$0<CT1/CT2<1.65$; and $0.25 \leq R1/f<0.40$.

16. The optical lens assembly of claim 15, wherein the first lens element has at least one inflection point.

17. The optical lens assembly of claim 15, wherein the object-side surfaces and the image-side surfaces of the first lens element and the second lens element are aspheric, the first lens element and the second lens element are made of plastic.

18. The optical lens assembly of claim 15, wherein an absolute value of a curvature radius of the object-side surface of the third lens element is smaller than an absolute value of a curvature radius of the image-side surface of the third lens element.

19. The optical lens assembly of claim 15, wherein a refractive index of the third lens element is a maximum value among refractive indexes of the three lens elements.

20. An image capturing device, comprising:
the optical lens assembly of claim 15;
a prism; and
an image sensor disposed on an image surface of the optical lens assembly.

21. An optical lens assembly, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has positive refractive power, the object-side surface of the first lens element is convex in a paraxial region thereof, and the first lens element has at least one inflection point; the second lens element has negative refractive power, the object-side surface of the second lens element is convex in a paraxial region thereof, and the image-side surface of the second lens element is concave in a paraxial region thereof; the image-side surface of the third lens element is convex in a paraxial region thereof, and an absolute value of a curvature radius of the object-side surface of the first lens element is smaller than an absolute value of a curvature radius of the image-side surface of the first lens element;

wherein the optical lens assembly has a total of three lens elements, a central thickness of the first lens element is CT1, a central thickness of the second lens element is CT2, a curvature radius of the object-side surface of the first lens element is R1, a focal length of the optical lens assembly is f, an axial distance between the first lens element and the second lens element is T12, and the following conditions are satisfied:

$0<CT1/CT2<1.65$;

$0<R1/f<0.40$; and $0<T12/CT2<0.80$.

22. The optical lens assembly of claim 21, wherein the object-side surfaces and the image-side surfaces of the first lens element and the second lens element are aspheric, each of the three lens elements is a single and non-cemented lens element, the central thickness of the second lens element is CT2, the axial distance between the first lens element and the second lens element is T12, and the following condition is satisfied:

$0<T12/CT2 \leq 0.18$.

23. The optical lens assembly of claim 21, wherein the first lens element and the second lens element are made of plastic, the axial distance between the first lens element and the second lens element is T12, an axial distance between the second lens element and the third lens element is T23, and the following condition is satisfied:

$0<T12/T23<0.50$.

24. The optical lens assembly of claim 21, wherein a half of maximum field of view of the optical lens assembly is HFOV, and the following condition is satisfied:

7.5 degrees<HFOV≤17.6 degrees.

25. An image capturing device, comprising:
the optical lens assembly of claim 21;
a prism; and
an image sensor disposed on an image surface of the optical lens assembly.

* * * * *